(12) United States Patent
Eastlake, III

(10) Patent No.: US 12,068,951 B2
(45) Date of Patent: Aug. 20, 2024

(54) PARAMETERIZED METHOD FOR NETWORK SUBGRAPH ROOT NODE SELECTION

(71) Applicant: Huawei Technologies Co., Ltd., Guandong (CN)

(72) Inventor: Donald Eggleston Eastlake, III, Apopka, FL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/154,706

(22) Filed: Jan. 13, 2023

(65) Prior Publication Data
US 2023/0155929 A1     May 18, 2023

Related U.S. Application Data

(63) Continuation of application No. PCT/US2020/041825, filed on Jul. 13, 2020.

(51) Int. Cl.
*H04L 45/42* (2022.01)
*H04L 45/24* (2022.01)

(52) U.S. Cl.
CPC .............. *H04L 45/42* (2013.01); *H04L 45/24* (2013.01)

(58) Field of Classification Search
CPC ......... H04L 45/00; H04L 45/02; H04L 45/12; H04L 45/16; H04L 45/28; H04L 45/48; H04L 41/0883; H04W 8/005; H04W 24/02; H04W 40/02; G06F 18/22; G06N 20/00
See application file for complete search history.

(56) References Cited

U.S. PATENT DOCUMENTS

| | | | |
|---|---|---|---|
| 6,745,172 B1* | 6/2004 | Mancisidor | H04L 41/0883 706/60 |
| 9,578,587 B2* | 2/2017 | Ikemoto | H04W 8/005 |
| 2004/0205239 A1* | 10/2004 | Doshi | H04L 45/12 709/241 |
| 2005/0038909 A1* | 2/2005 | Yoshiba | H04L 45/16 709/241 |
| 2005/0152289 A1* | 7/2005 | Nagata | H04L 45/02 370/256 |
| 2007/0030811 A1* | 2/2007 | Frei | H04L 45/00 370/238 |
| 2009/0201899 A1* | 8/2009 | Liu | H04W 40/02 370/338 |
| 2012/0072475 A1* | 3/2012 | Morrison | G06F 18/22 708/200 |

(Continued)

OTHER PUBLICATIONS

Moy, J., "OSPF Version 2," Network Working Group, RFC 2328, Apr. 1998, 244 pages.

(Continued)

*Primary Examiner* — Dustin Nguyen
(74) *Attorney, Agent, or Firm* — Conley Rose, P.C.

(57) ABSTRACT

A method and network device for root selection, where the method includes: obtaining link costs of links connecting a plurality of nodes in the network; selecting a weighting parameter based at least partly on the link costs; calculating node costs corresponding to each of the plurality of the nodes based on the link costs and the weighting parameter; and selecting a node as the root node based on the node costs, wherein the root node is selected from the plurality of nodes.

17 Claims, 16 Drawing Sheets

(56) References Cited

U.S. PATENT DOCUMENTS

| | | | | |
|---|---|---|---|---|
| 2012/0278263 | A1* | 11/2012 | Borthwick | G06N 20/00 |
| | | | | 706/12 |
| 2013/0017796 | A1* | 1/2013 | Milner | H04W 24/02 |
| | | | | 455/67.13 |
| 2014/0281670 | A1* | 9/2014 | Vasseur | H04L 45/28 |
| | | | | 714/4.11 |
| 2020/0296031 | A1* | 9/2020 | Iwashita | H04L 45/48 |
| 2020/0322868 | A1* | 10/2020 | Claffey | H04W 40/02 |
| 2021/0119910 | A1* | 4/2021 | Chen | H04L 45/12 |

OTHER PUBLICATIONS

"Information technology—Telecommunications and information exchange between systems—Intermediate System to Intermediate System intra-domain routeing information exchange protocol for use in conjunction with the protocol for providing the connectionless-mode network service (ISO 8473)," ISO/IEC 10589, Second Edition, Nov. 15, 2002, 210 pages.

Perlman, R., et al., "Routing Bridges (RBridges): Base Protocol Specification," Internet Engineering Task Force (IETF), RFC 6325, Jul. 2011, 99 pages.

R. Perlman, "Interconnections: Bridges, Routers, Switches and Internetworking Protocols, Second Edition," Released Sep. 1999, English Abstract, 2 pages.

White, R., et al., "IS-IS Optimal Distributed Flooding for Dense Topologies," Network Working Group, Jul. 27, 2020, 23 pages.

Li, T., et al., "Dynamic Flooding on Dense Graphs," Internet Engineering Task Force, draft-ietf-lsr-dynamic-flooding-14, Jun. 8, 2023, 46 pages.

Chen, S., et al., "An Algorithm for Computing Dynamic Flooding Topologies," Internet Engineering Task Force, draft-chen-lsr-dynamic-flooding-algorithm-00, Mar. 3, 2020, 9 pages.

Chen, H., et al., "Flooding Topology Computation Algorithm," Network Working Group, draft-cc-lsr-flooding-reduction-09, Jun. 5, 2020, 23 pages.

* cited by examiner

300

| Node Number | $Link_{HBW}$ 100mbps cost= 200000 | $Link_{LBW}$ 40mbps cost= 500000 | k= 0.0 | k= 0.80 | k= 1.00 | k= 1.25 |
|---|---|---|---|---|---|---|
| 1 | 3 | 3 | 0.17 | 3,920.21 | 47,619.05 | 1,069,584.62 |
| 2 | 1 | 5 | 0.17 | 5,117.50 | 66,666.67 | 1,632,664.49 |
| 3 | 1 | 8 | 0.11 | 3,594.64 | 47,619.05 | 1,193,129.63 |
| 4 | 2 | 4 | 0.17 | 4,439.55 | 55,555.56 | 1,292,458.80 |
| 5 | 0 | 5 | 0.20 | 7,247.80 | 100,000.00 | 2,659,147.95 |
| 6 | 1 | 4 | 0.20 | 5,959.00 | 76,923.08 | 1,861,214.28 |
| 7, 8 | 0 | 3 | 0.33 | 12,079.66 | 166,666.67 | 4,431,913.25 |
| 9 | 0 | 10 | 0.10 | 3,623.90 | 50,000.00 | 1,329,573.97 |
| 10, 11 | 0 | 1 | 1.00 | 36,238.98 | 500,000.00 | 13,295,739.74 |
| 12, 13 | 0 | 2 | 0.50 | 18,119.49 | 250,000.00 | 6,647,869.87 |
| 14, 15 | 0 | 1 | 1.00 | 36,238.98 | 500,000.00 | 13,295,739.74 |
| 16 | 0 | 3 | 0.33 | 12,079.66 | 166,666.67 | 4,431,913.25 |
| 17 | 0 | 2 | 0.50 | 18,119.49 | 250,000.00 | 6,647,869.87 |
| 18, 19 | 0 | 1 | 1.00 | 36,238.98 | 500,000.00 | 13,295,739.74 |
| 20, 21 | 0 | 4 | 0.25 | 9,059.75 | 125,000.00 | 3,323,934.94 |
| 22, 23, 24, 25 | 0 | 2 | 0.50 | 18,119.49 | 250,000.00 | 6,647,869.87 |
| 26, 27, 28, 29 | 0 | 1 | 1.00 | 36,238.98 | 500,000.00 | 13,295,739.74 |
| 30 | 0 | 2 | 0.50 | 18,119.49 | 250,000.00 | 6,647,869.87 |

PARAMETERIZED METHOD FOR NETWORK SUBGRAPH ROOT NODE SELECTION

CROSS-REFERENCE TO RELATED APPLICATIONS

This application is a continuation of International Patent Application No. PCT/US2020/041825, filed on Jul. 13, 2020, and titled "Parameterized Method for Network Subgraph Root Node Selection," which is hereby incorporated by reference in its entirety.

TECHNICAL FIELD

The present disclosure is generally related to network topologies, and more particularly, to methods of selecting a root node for a subgraph of a given network topology.

BACKGROUND

Packet switched computer networks comprise a plurality of nodes interconnected to one another via links. When user data traffic arrives at an edge node from source a user equipment (UE), such traffic is forwarded by that node and each subsequent node it encounters to zero or more directly connected nodes in the network. If the traffic reaches one or more subsequent edge nodes, it usually departs the network to a destination UE. Control data may also be transmitted between nodes in the network. In a process referred to as "flooding," control data may be forwarded to reach every node in the network.

SUMMARY

A first aspect relates to a method of selecting a root node for a to-be-constructed subgraph of a network. The method includes: obtaining link costs of links connecting a plurality of nodes in the network; selecting a weighting parameter based at least partly on the link costs; calculating node costs corresponding to each of the plurality of the nodes based on the link costs and the weighting parameter; and selecting a node as the root node based on the node costs, wherein the root node is selected from the plurality of nodes.

Optionally, in any of the preceding aspects, another implementation of the aspect provides that selecting the node as the root node comprises selecting at least one node having a lowest node cost.

Optionally, in any of the preceding aspects, another implementation of the aspect provides that selecting the weighting parameter is based on a first quantity of links connected to each node and a second quantity of links that are of lower link costs than other links in the network.

Optionally, in any of the preceding aspects, another implementation of the aspect provides for calculating the node costs corresponding to each of the plurality of nodes using the following formula:

$$\text{Node Cost} = \frac{HarmonicMean(C1^k, C2^k, C3^k, \ldots)}{NumberOfLinks},$$

where C1, C2, C3, . . . represent the links costs, where k represents the weighting parameter, and where the Number of Links is a quantity of links connected to the node for which the node cost is calculated.

Optionally, in any of the preceding aspects, another implementation of the aspect provides that C1, C2, C3, . . . are integers greater than zero.

Optionally, in any of the preceding aspects, another implementation of the aspect provides that selecting the weighting parameter comprises setting k to a value greater than 1.

Optionally, in any of the preceding aspects, another implementation of the aspect provides that selecting the weighting parameter comprises setting k to a value between 0 and 1.

Optionally, in any of the preceding aspects, another implementation of the aspect provides that selecting the weighting parameter comprises setting k to a value equal to 1.

A second aspect relates to a network device for root node selection. The network device includes a storage device and a processor coupled to the storage device. The processor is configured to execute instructions stored on the storage device to cause the network device to: obtain link costs of links connecting a plurality of nodes in the network; select a weighting parameter based at least partly on the link costs; calculate node costs corresponding to each of the plurality of the nodes based on the link costs and the weighting parameter; and select a node as a root node based on the node costs, wherein the root node is selected from the plurality of nodes Optionally, in any of the preceding aspects, another implementation of the aspect provides that the network device selects the node as the root node by selecting at least one node having a lowest node cost.

Optionally, in any of the preceding aspects, another implementation of the aspect provides that the network device selects the weighting parameter based on a first quantity of links connected to each node and a second quantity of links that are of lower link costs than other links in the network.

Optionally, in any of the preceding aspects, another implementation of the aspect provides for calculating the node costs corresponding to each of the plurality of nodes using the following formula:

$$\text{Node Cost} = \frac{HarmonicMean(C1^k, C2^k, C3^k, \ldots)}{NumberOfLinks},$$

where C1, C2, C3, . . . represent the links costs, where k represents the weighting parameter, and where the Number of Links is a quantity of links connected to the node for which the node cost is calculated.

Optionally, in any of the preceding aspects, another implementation of the aspect provides that C1, C2, C3, . . . are integers greater than zero.

Optionally, in any of the preceding aspects, another implementation of the aspect provides that the network device selects the weighting parameter by setting k to a value greater than 1.

Optionally, in any of the preceding aspects, another implementation of the aspect provides that the network device selects the weighting parameter by setting k to a value between 0 and 1.

Optionally, in any of the preceding aspects, another implementation of the aspect provides that the network device selects the weighting parameter by setting k to a value equal to 1.

A third aspect relates to a network device for root node selection. The network device includes: means for obtaining link costs of links connecting a plurality of nodes in a network; means for selecting a weighting parameter based at least partly on the link costs; means for calculating node costs corresponding to each of the plurality of the nodes based on the link costs and the weighting parameter; and means for selecting a node as the root node based on the node costs, wherein the root node is selected from the plurality of nodes.

Optionally, in any of the preceding aspects, another implementation of the aspect provides that selecting the node as the root node comprises selecting at least one node having a lowest node cost.

Optionally, in any of the preceding aspects, another implementation of the aspect provides that selecting the weighting parameter is based on a first quantity of links connected to each node and a second quantity of links that are of lower link costs than other links in the network.

Optionally, in any of the preceding aspects, another implementation of the aspect provides that a node cost for calculating the node costs corresponding to each of the plurality of nodes is calculated using the following formula:

$$\text{Node Cost} = \frac{HarmonicMean(C1^k, C2^k, C3^k, \ldots)}{NumberOfLinks},$$

where C1, C2, C3, . . . represent the links costs, where k represents the weighting parameter, and where the Number of Links is a quantity of links connected to the node for which the node cost is calculated.

The disclosed techniques improve construction of network subgraphs by prioritizing richly connected and more powerful nodes for selection as a root node. Computing the priority of a particular node may be facilitated by prioritizing nodes according to information local to each node, such as a total number of links connecting each node to other nodes as well as the cost of such links, where link costs may be based on bandwidth. To this end, a root node of a to-be-constructed subgraph may be calculated by selecting a node whose cost has a smallest quotient of the harmonic mean of link costs divided by a number of links connected to that node. While this calculation might be impractical for humans to perform, one or more network components (e.g., nodes, routers, controllers, etc.) can be configured to calculate such quotients without having to perform any sort of exponential or polynomial difficult computation of a global metric over an entire network/subgraph/path.

For the purpose of clarity, any one of the foregoing implementation forms may be combined with any one or more of the other foregoing implementations to create a new embodiment within the scope of the present disclosure. These embodiments and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
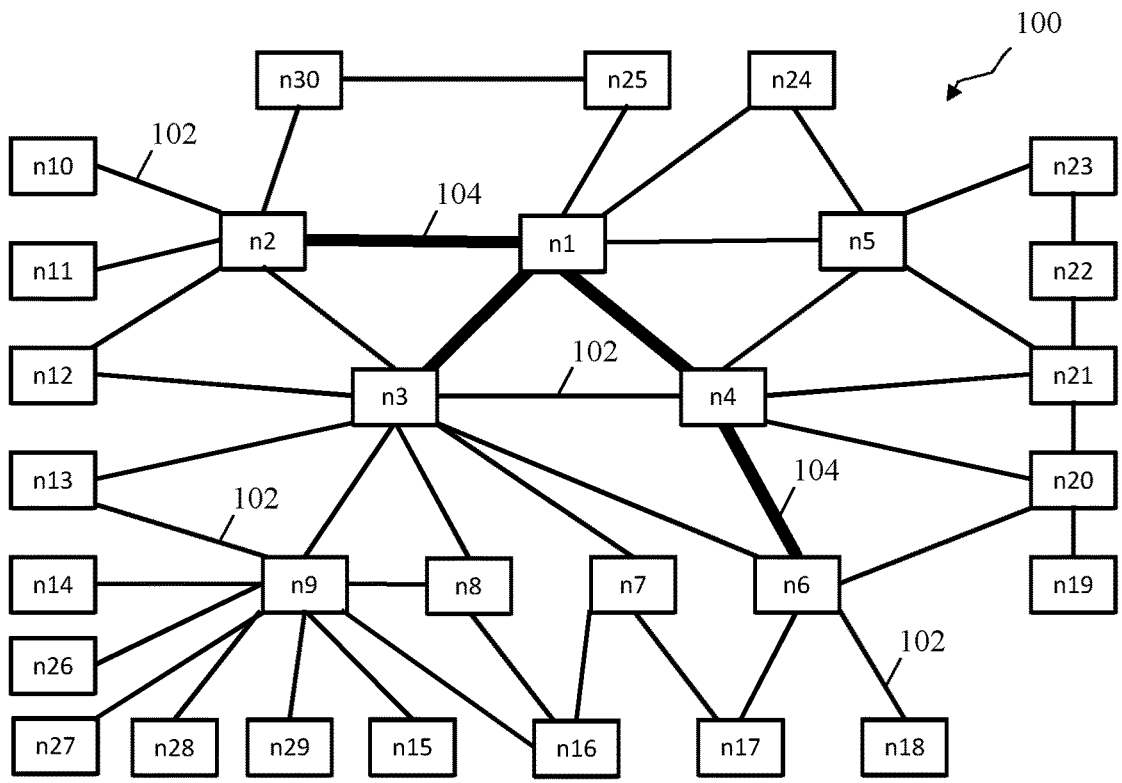
FIG. 1A is a schematic diagram of a network according to an embodiment of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, a "tree" or "distribution tree" is used for transmission of user data and/or control data. A tree is a subgraph comprising an acyclic subset of the inter-node links that reaches every node in the network. Typical examples of such trees/graphs include a "spanning tree protocol" graph in bridged networks and multicast data distribution trees in the Transparent Interconnection of Lots of Links (TRILL) specification. Unless stated otherwise, "tree," "distribution tree," "subgraph," and "graph" are used herein interchangeably.

In other cases, a graph may be used for flooding control information. Such a graph differs from an acyclic tree in that it usually provides some redundancy of paths, and thus includes cycles. For example, the graph might be constructed such that each node is at least doubly connected, i.e., each node is attached to at least two links that are part of the flooding graph. Alternatively, the graph might be constructed so each node is triply or even more richly connected. Such more richly connected graphs can be constructed by first constructing an acyclic tree, and then adding selected links to achieve the desired richness of connectivity. However, there may be some nodes in the network that are only singly connected or otherwise have limited connectivity for which the desired richness of connectivity is unreachable.

A routing protocol specifies how routers communicate with each other, distributing information that enables them to select routes between any two nodes on a computer network. An interior gateway protocol (IGP) is a type of protocol used for exchanging routing information between gateways (commonly routers) within a network, which may be any suitable type such as an autonomous system (AS). This routing information can then be used to route network-layer protocols like Internet Protocol (IP) packets.

Within IGP, there are different types of protocols such as a link-state routing protocol. The link-state routing protocol is performed by every switching node in the network (i.e., nodes that are prepared to forward packets; in the Internet, these are called routers). The basic concept of link-state routing is that every node constructs a map of the connectivity of the network, in the form of a graph, showing which nodes are connected to which other nodes. Each node then independently calculates the best, for example lowest cost, logical path or the best next hop interface from it to every possible destination in the network. Each collection of best paths will then form each node's routing table. Examples of link-state routing protocols include Open Shortest Path First (OSPF) routing protocol and Intermediate System to Intermediate System (IS-IS). OSPF is a standard routing protocol designated by the Internet Engineering Task Force (IETF). OSPF uses Link State Advertisement (LSA) to exchange routing information between routers. IS-IS is a routing protocol standardized by the International Standards Organization (ISO). IS-IS uses Link State Protocol Data Unit (LSP) to exchange routing information between routers. For link-state routing protocols such as OSPF or IS-IS, control data is commonly flooded by each node sending such data on many and/or all links, with received duplicates of control data being discarded. This method of flooding control data can be wasteful in some cases. In a richly connected network, for example, a node will typically receive many copies (possibly even a hundred or more) of a link state update. As such, a flooding graph that reduces redundant transmission of control information may be used.

The construction or derivation of a distribution tree, flooding graph, or the like is usually implemented by the following steps: (a) select a root node from which to grow the tree/graph (the root node may be designated as layer zero); (b) select and add links from that root node to directly connected nodes (these links and directly connected nodes may be designated as layer one); (c) if there are remaining nodes that are not part of the tree/graph, select links that are not yet part of the tree from layer one nodes to nodes that are not yet part of the tree (these added links and nodes may be designated as layer two); and (d) in each subsequent step, if there are remaining nodes that are not part of the tree, select links that are not yet part of the tree from the nodes of the layer added by the previous step to nodes that are not yet part of the tree (these added links and nodes may be designated as the next higher numbered layer, e.g., layer three, layer four, etc.). For some types of sub-graphs, such as link state flooding sub-graphs, there may be one or more additional stages in which additional links are added to the sub-graph. However, a tree or subgraph might be constructed in other ways after the selection of a root node. For example, links could be added from remote nodes working towards the root rather than from the root outward. Alternatively, these techniques could be combined or a tree could be built in other ways with a selected root.

A tree may have multiple parallel physical links between a pair of nodes. When this situation is detected, (1) all but one of the links may be disabled for traffic; (2) the multiple links may be treated as a single link with traffic being split across the links; or (3) some combination of (1) and (2), e.g., with some of the parallel physical links being disabled while splitting traffic across those still enabled. In any case, all of these options may be treated as there being a single logical link between the nodes.

Links have a "cost" associated with them and the optimization of the path for data through a network is commonly thought of as minimizing the sum of the costs associated with the links over which that data passes. Most commonly the "cost" for a link is based on the reciprocal of the speed of that link. For example, the cost might be set to 20,000,000,000,000 (20 trillion) divided by the link speed in bits per second (bps). As another example, the cost could be based on reliability, monetary cost, delay, security, or any combination of these or other factors. Traditionally, the cost of a link is expressed as a positive integer. Costs are usually symmetric, meaning a link connecting nodes N1 and N2 would have the same cost from N1 to N2 as that from N2 to N1. However, there can be asymmetric costs where the cost from N1 to N2 is different from the cost from N2 to N1.

It is possible to use different definitions of link cost for different traffic. For example, traffic such as real-time gaming traffic might be very sensitive to delay, while bulk file transfers might be more sensitive to bandwidth or monetary cost. As such, different subgraphs may be constructed for such different traffic. For unicast routing applications, the goal is to minimize the cost of the path (sequence of links) over which data flows.

In a given tree, every node should have the same understanding of the tree's topology so that when receiving traffic on a link, the node can know what other links to send that data on. Constructing a subgraph of a network can be done in a distributed or centralized manner. For example, a distributed subgraph construction involves each node having sufficient information to compute how it fits into the subgraph. In contrast, a centralized subgraph construction involves one or more centralized controllers processing information to construct the subgraph and then sending that information to all of the nodes in the network.

FIG. 1A is a schematic diagram of a network 100 comprising a plurality of nodes n1, n2 . . . , n30 interconnected to one another via a plurality of links. In some embodiments, the links may be of varying bandwidths. In FIG. 1A, for example, the links include low bandwidth links 102 and high bandwidth links 104, the latter of which are denoted by thicker and bolder lines. Although 4 high bandwidth links (i.e., n1-n2, n1-n3, n1-n4, and n4-n6) are depicted in this example, the network 100 may include more or less high bandwidth links in other examples.

Every node n1, n2 . . . , and n30 in the network 100 should have the same understanding of the network's topology so that when receiving traffic on a link, the node can know what other links to send that data on. To this end, a subgraph of the network 100 may be constructed. Constructing a subgraph may take place in a distributed or centralized manner. For example, a distributed subgraph construction involves configuring every node n1, n2 . . . , and n30 with sufficient information to compute how it fits into the subgraph. In contrast, a centralized subgraph construction involves one or more centralized controllers processing information of the constructed subgraph and then sending that information to all nodes n1, n2 . . . , and n30 in the network 100.

Regardless of the manner chosen, constructing a subgraph for the network 100 may begin with selecting a root node (e.g., n1, n2 . . . , or n30) from which the subgraph is to be constructed. One common selection method according to other approaches involves manually configuring a priority for a node to be selected as the root node. Alternatively, the root node may be automatically selected based on an identifier such as a serial number, an interface address (e.g., a medium access control (MAC) or Internet Protocol (IP) address of each node's port), an "order" or "degree" of a node (i.e., the number of other nodes to which it is directly connected by a link), or the like.

For example, a node having the lowest port MAC address or a node having the highest order node may be automatically selected as the root node. In some cases, a tiebreaking procedure may be implemented when the manual or automatic selection of a root node results in multiple root node candidates (e.g., if two or more nodes may have the same priority or order). In such cases, the tiebreaking procedure may be based on an arbitrary unique number associated with a node (e.g., built-in device serial number, the lowest or highest address of one of the node ports, or the like).

Using an example according to other approaches, assume that the highest numbered node is automatically selected as the root node for constructing a subgraph of the network 100. Further assume the following: at each subsequent stage, the edge nodes of layer N are examined starting from the highest numbered layer N node to the lowest numbered layer N node; for each node examined, a link is added to each node to which it has a direct link if that node is not yet part of the subgraph in order to construct layer N+1 of the tree; and this same process is repeated for the next higher numbered layer until all nodes n1, n2 . . . , and n30 are part of the subgraph. A process of constructing a subgraph based on the foregoing example is further described with respect to FIGS. 1B-1H.

Figure 1B:
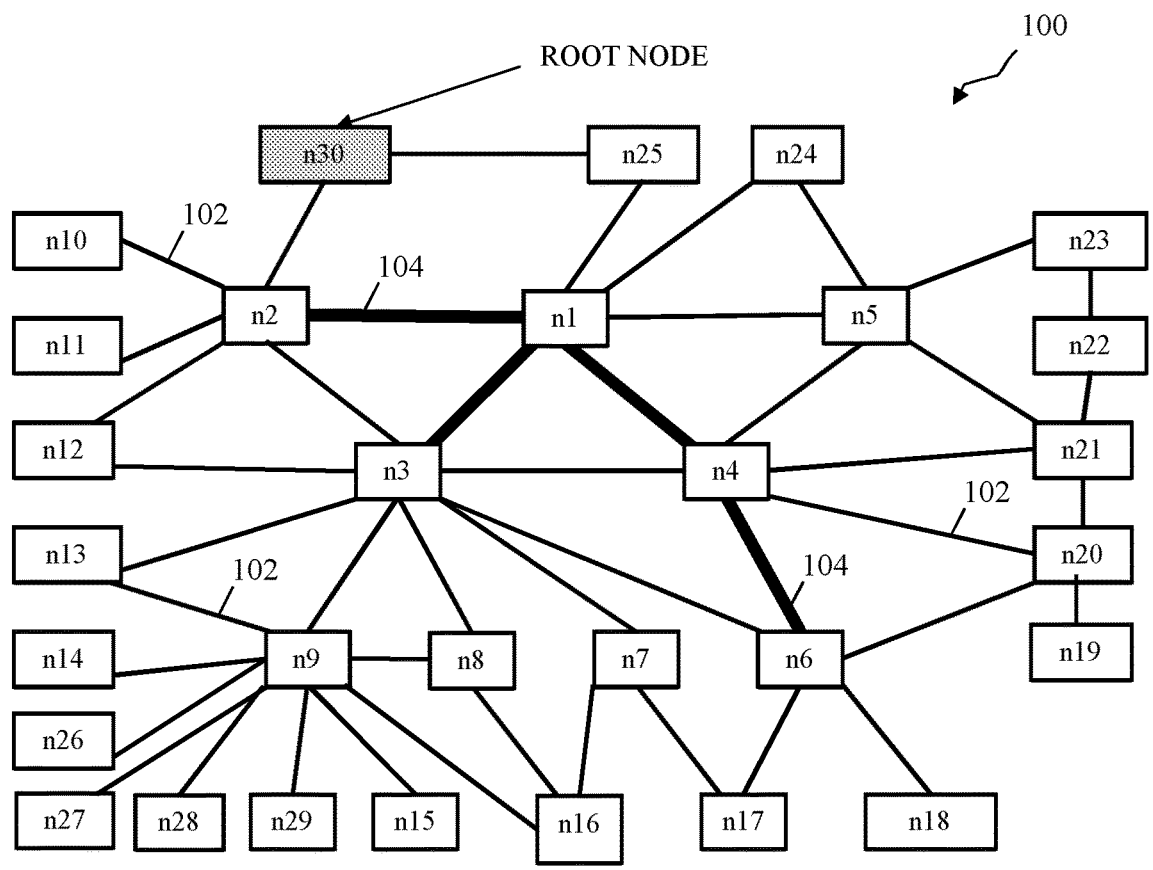
FIGS. 1B-1H depict different stages of a subgraph constructed for the network in FIG. 1A.
Figure 1C:
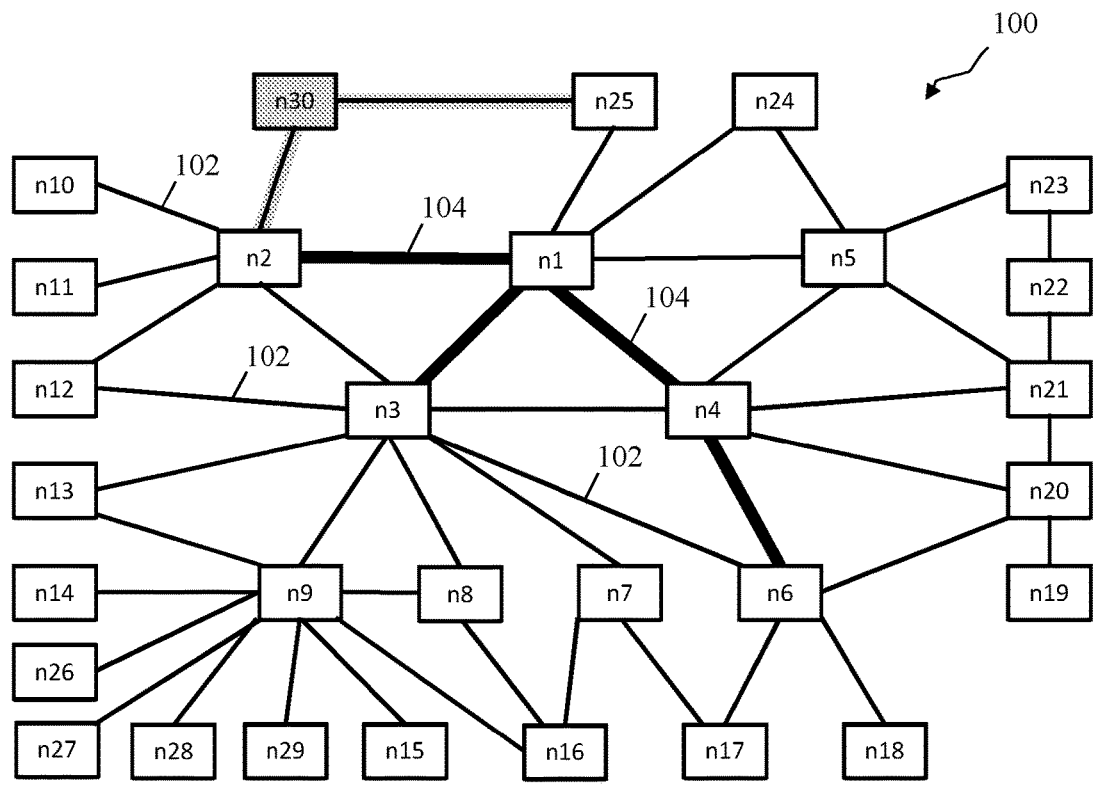

As shown in FIG. 1B, the process begins with automatically selecting node n30 as the root node because n30 is the highest numbered node in the network 100. The selection of root node n30 completes stage zero of constructing the subgraph. Note that each node to which the root node is connected in the following first stage may refer to a "layer one node." Similarly, each node to which a layer one node is connected in the second stage may refer to a "layer two node," each node to which a layer two node is connected in the third stage may refer to a "layer three node," and so forth.

The first stage of constructing the subgraph involves connecting the root node n30 to one or more other nodes in the network 100 that are not yet part of the subgraph. In this example, the root node n30 has two available connections. Thus, the root node n30 may be connected to 2 layer one nodes by adding one link from n30 to n25 and another link from n30 to n2 (the added links are shown via highlighted lines in FIG. 1C). The addition of these two links completes the first stage.

Figure 1D:
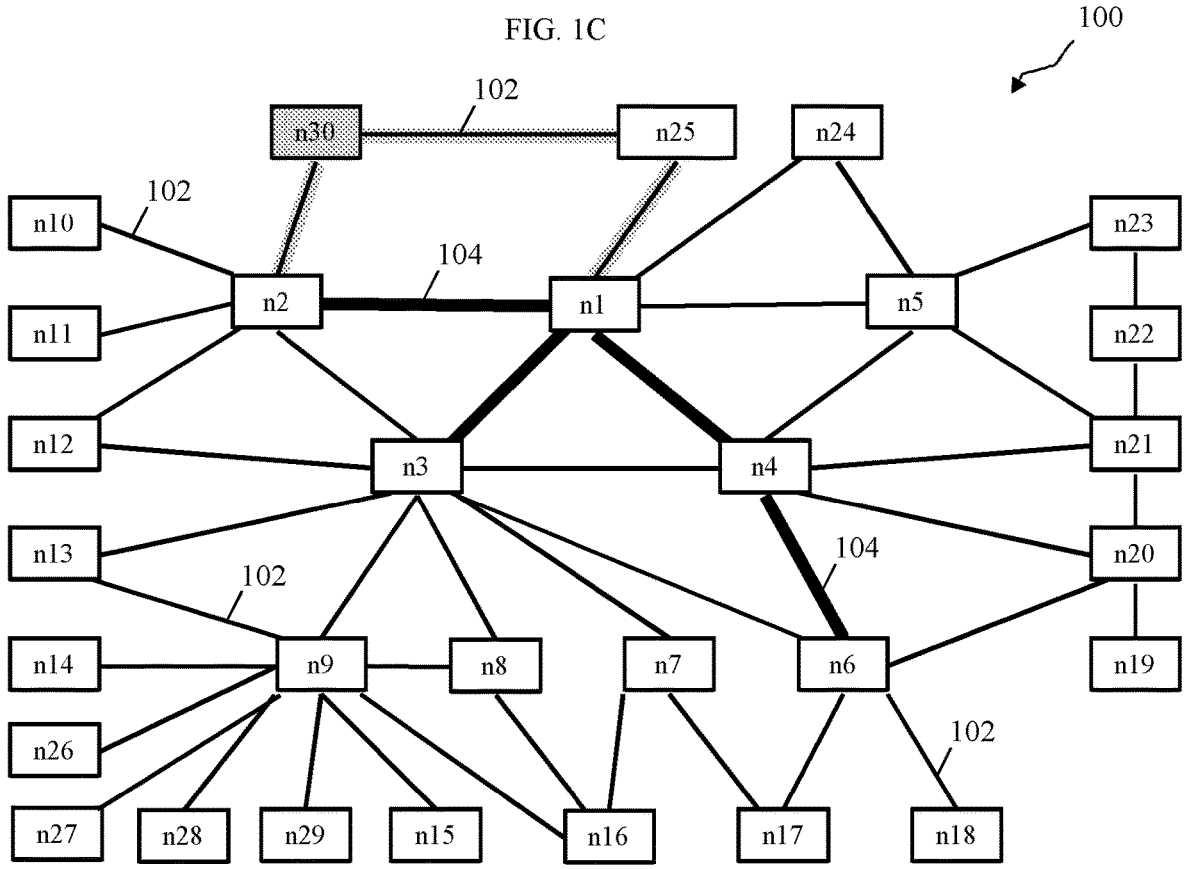
Figure 1E:
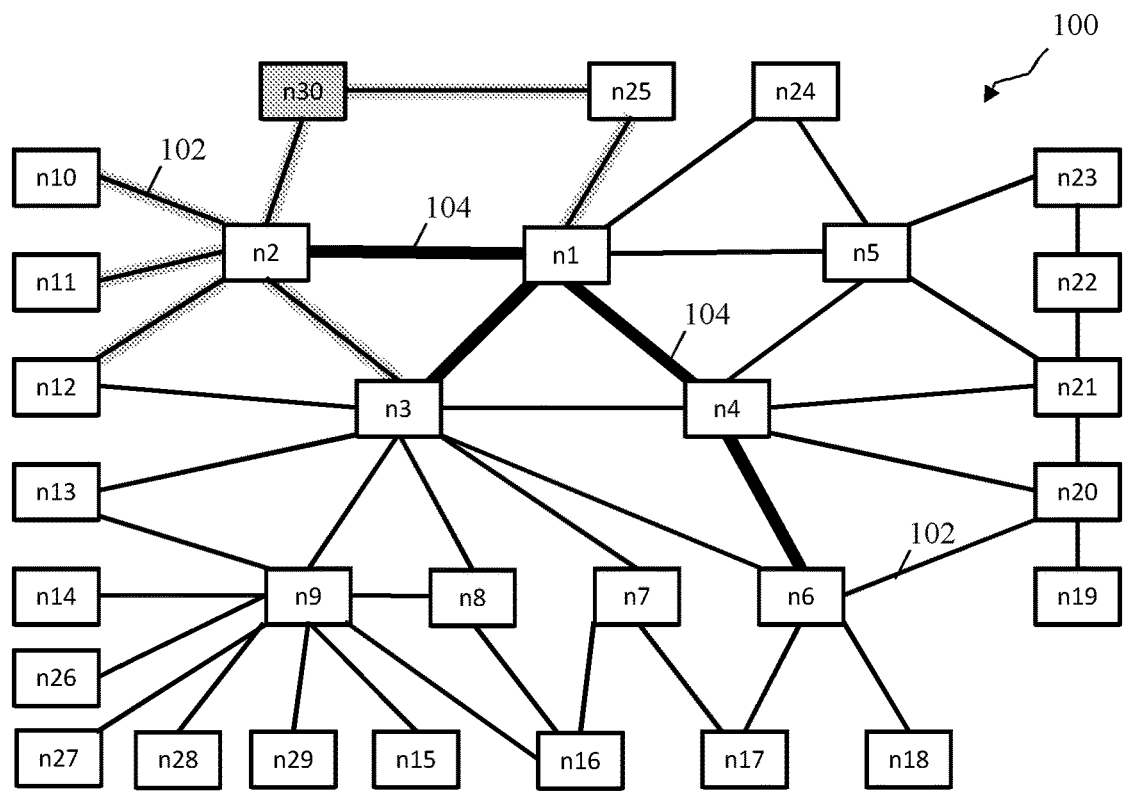

The second stage involves connecting layer one nodes n25 and n2 to one or more layer two nodes. As shown in FIG. 1D, this stage begins with adding a link from n25 to a layer two node n1 before adding any links from n2 because n25 is a higher numbered node than n2. Since no other connection links are available for n25, the second stage ends with adding 4 links from n2 to layer two nodes n10, n11, n12, and n3, such as shown in FIG. 1E. Note that although a link from n2 to n1 is available, this link is not added because n1 has already been connected via the link from n25. Further, adding a link from n2 to n1 would result in a loop (i.e., between n30, n25, n1, and n2), which can adversely impact data transmissions within the network 100 (e.g., when sending broadcast traffic or multicast data).

Figure 1F:
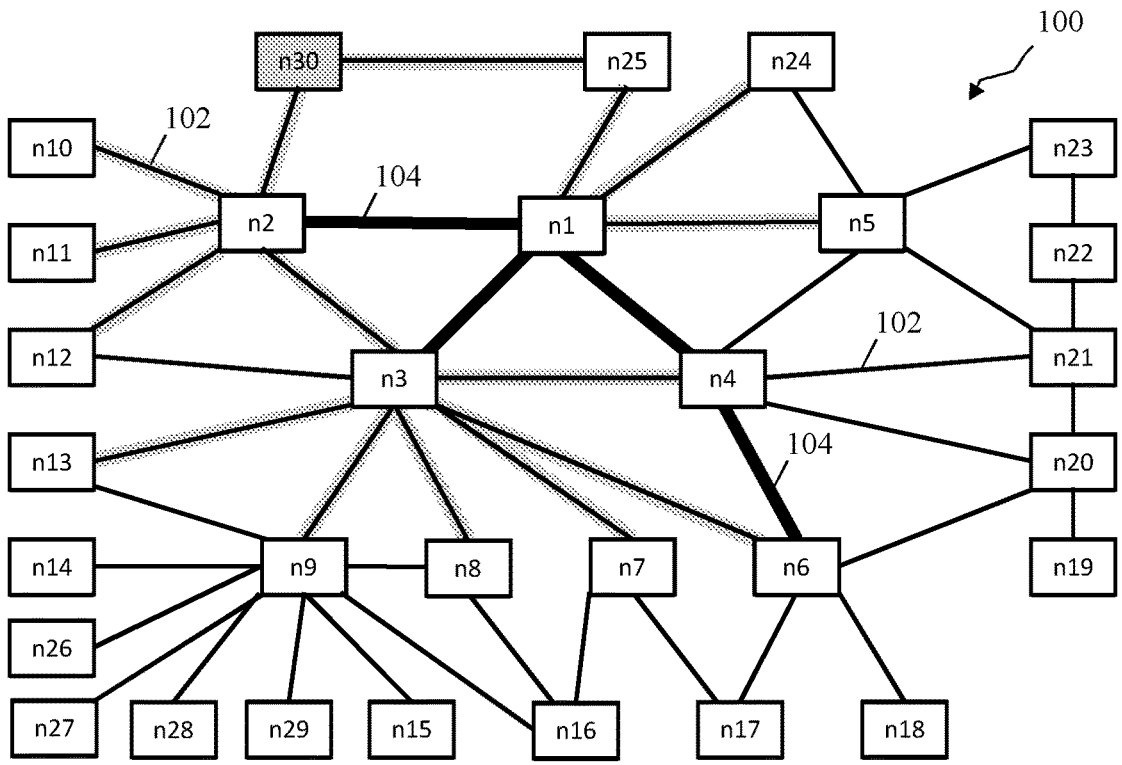

The third stage includes adding links from the layer two nodes (i.e., n1, n10, n11, n12, and n3) to one or more nodes that not yet part of the subgraph. Note that no additional links are available from layer two nodes n10 and n11. While a link is available for connecting n12 to n3, this link is not added to the subgraph because n3 is already connected to n2. Thus, the third stage may ignore layer two nodes n10, n11, and n12 and proceed with adding links from n1 and n3, beginning with the latter since n3 is a high numbered node. As shown in FIG. 1F, the third stage is complete after adding 6 links from n3 to layer three nodes n13, n9, n8, n7, n6, and n4, and then adding 2 links from n1 to layer three nodes n24 and n5.

Figure 1G:
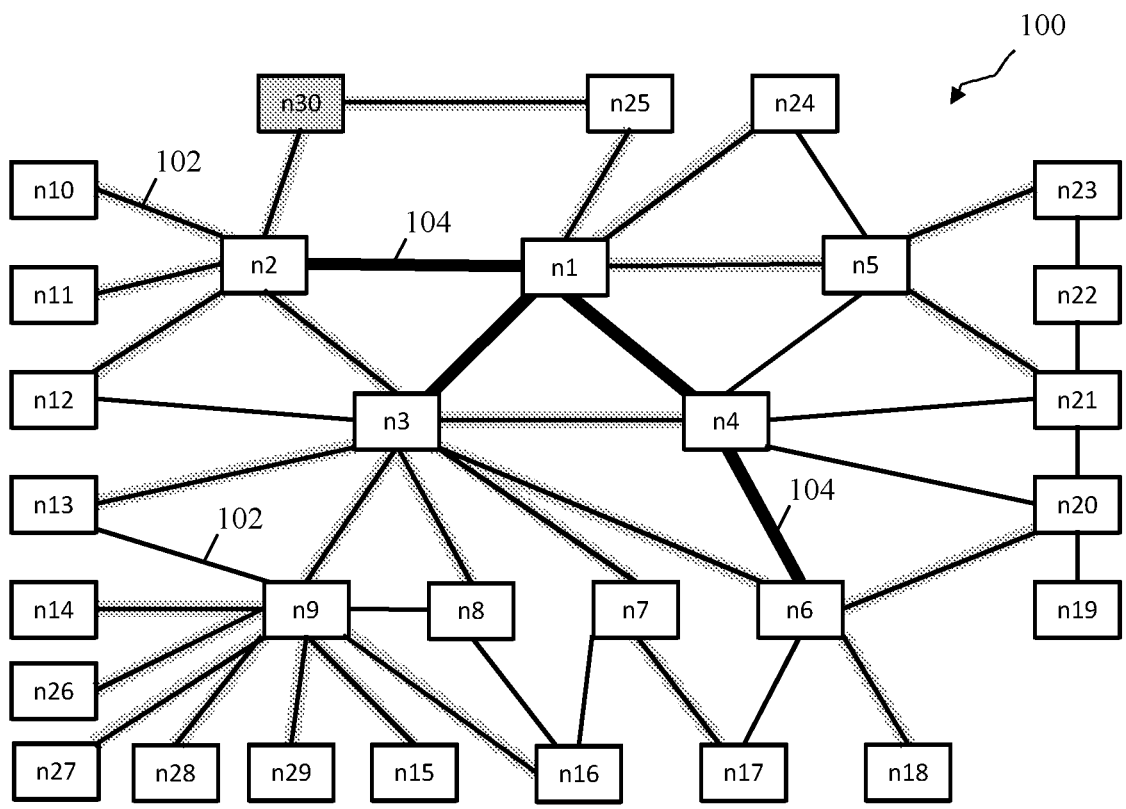

The fourth stage commences with the highest numbered layer three node n24, which has one available connection to n5. However, a link is not added from n24 to n5 because n5 has already been connected to n1. The second highest numbered layer three node is n13, but a link from n13 to n9 is not added for similar reasons. The third highest numbered layer three node is n9, which has 8 available connections. Thus, the fourth stage begins with adding 7 links from n9 to layer four nodes n14, n26, n27, n28, n29, n15, and n16, but without adding an eighth link from n9 to n8 because n8 has already been connected to n3. The next highest numbered layer three node is n8, but a link is not added from n8 to n16 because n16 has already been connected to n9. The next highest numbered layer three node is n7, which has two available connections. Here, a link is added from n7 to layer four node n17, but not to n16. Next, 2 links are added from n6 to layer four nodes n18 and n20, but not to n17. As shown in FIG. 1G, the fourth stage is complete after adding 2 links from n5 to layer four nodes n23 and 21.

Figure 1H:
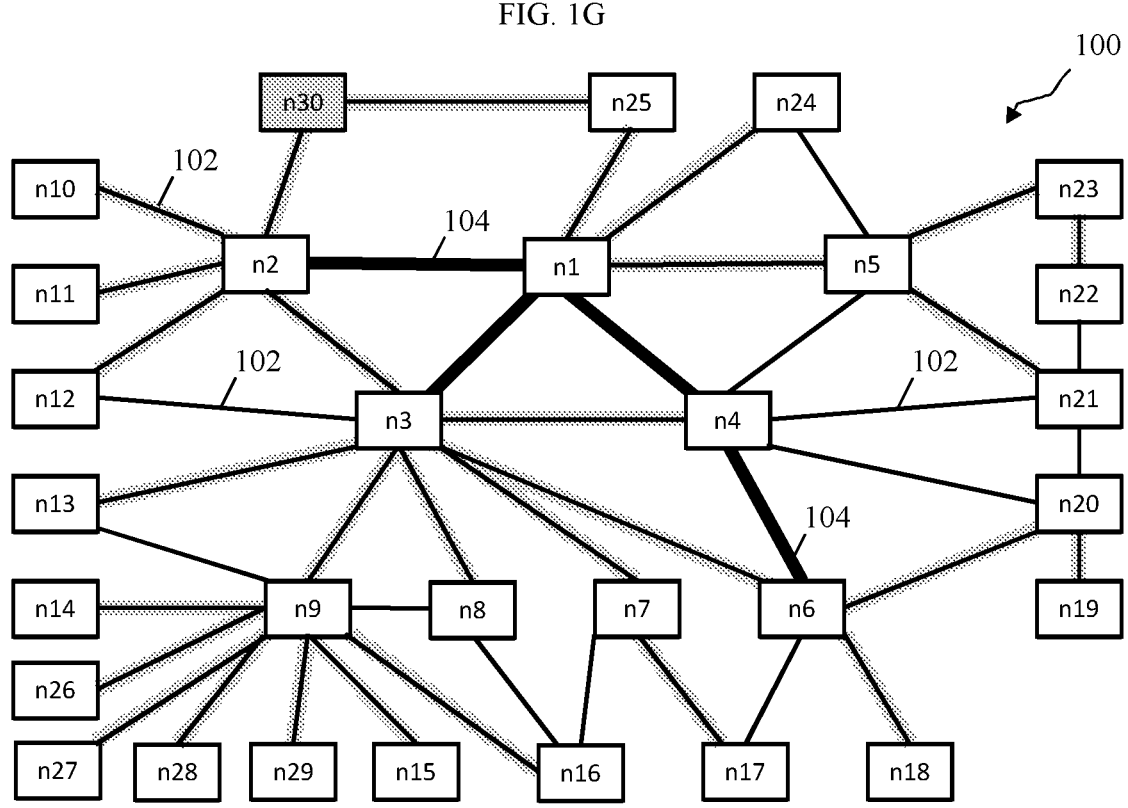

The fifth stage begins with adding a link from n23 to layer five node n22, and ends with adding a link from n20 to layer five node n19, thereby completing the subgraph. As shown in FIG. 1H, the constructed subgraph represents a complete acyclic tree spanning all nodes n1, n2 . . . , and n30 in the network 100. Although the final results depend on the characteristics of the network 100, it can be seen that constructing a subgraph according to other approaches (e.g., using the highest numbered node as a root node) can be less than optimal.

For example, the subgraph depicted in FIG. 1H does not use any of the high bandwidth links (i.e., n2-n1, n1-n3, n1-n4, or n4-n6) in the network 100. Additionally, all traffic between the upper right area of the network 100 and the lower and left areas of the network 100 must pass through root node n30 and multiple lower bandwidth links in the far upper left corner of the network 100. Further, the path between some edge nodes can include as many as 9 hops (e.g., path between edge nodes n22 and n14).

An improved subgraph may be constructed using better connected and more powerful nodes as a root node. Different applications may favor different types of roots. For example, high bandwidth user traffic with many sources and sinks favors subgraphs premised on nodes with high bandwidth links. Heuristically, nodes with higher bandwidth links are also more capable and have lower latency than nodes with links of lower bandwidth. As such, nodes with higher bandwidth links tend to have more powerful hardware (e.g., to handle short inter-packet arrival times) and are likely more efficient in moving traffic from port to port. On the other hand, flooding graphs for lower bandwidth control traffic (e.g., link state information) favor nodes with many links in order to more rapidly disseminate control information to many other nodes. Thus, a better connected and more powerful node may depend on the presence of low-cost links and the number of links connected to that node.

Disclosed herein is a method of constructing a subgraph by prioritizing nodes for selection as a root node based on information local to that node. The method involves prioritizing nodes using a "node cost" for each node, where the node cost is calculated as the harmonic mean of link costs raised to a parametric power. The method further includes selecting as a root node the node based on the lowest node cost, which may be based on a weighting parameter to account for low-cost links and a quantity of connecting links. The method may be implemented without computing a global metric over an entire network/subgraph, the computation of which might require performing complex exponential or polynomial calculations of the number of nodes or total number of links in the network. Further, the method is applicable to routing applications, link-state flooding graphs, multicast/broadcast distribution trees, and related standards. These and other features are detailed below.

Figure 2:
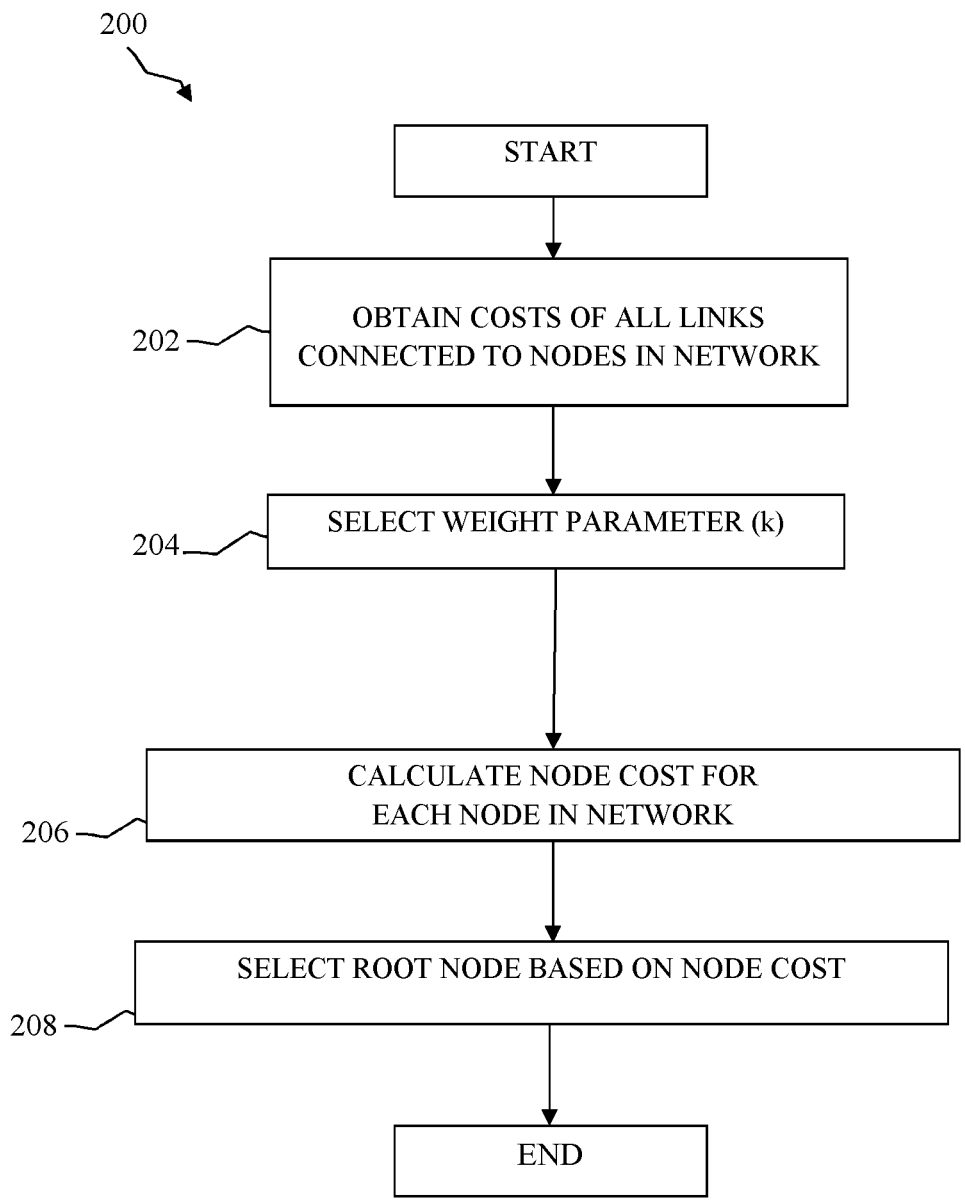
FIG. 2 is a flow chart of selecting a root node for a to-be-constructed subgraph of the network in FIG. 1A.

FIG. 2 illustrates a method 200 of selecting a root node for a to-be-constructed subgraph of a network such as the network 100 in FIG. 1A. The operations in the method 200 may be performed in the order shown, or in a different order. Further, two or more of the operations of the method 200 may be performed concurrently instead of sequentially. In some implementations, the method 200 may be employed using a distributed tree calculation where every node (e.g., n1, n2 . . . , and n30) selects the same root node and computes the same subgraph of a network. In other implementations, the method 200 may be employed via one or more centralized controllers (e.g., a software-defined networking (SDN) controller) configured to select the root node, compute the subgraph, and provision all relevant network information to every node in the network.

At block 202, the method 200 obtains costs of all links connected to nodes in a network, where it may be assumed that each node has one or more links to other nodes in the network. Using the network 100 in FIG. 1A, for example, a cost C of each link for a particular node may be denoted as C1, C2, . . . , Cm, where m is the quantity of links connected to that node. Thus, in FIG. 1A, the costs of links connected to node n7 may be denoted as C1, C2, Cm, where Cm is C3 since node n7 is connected to three links. In some embodiments, link costs may be based on bandwidth, where a cost C of a particular low or high bandwidth link may be set to a value divided by link speed, e.g., $C=2*10^{13}$/bps. In other implementations, link costs may be based on one or more factors such as bandwidth, reliability, delay/latency, monetary cost per bit, or some combination thereof.

At block 204, the method 200 selects a weighting parameter k to be used at block 206. Additional details regarding the selection of weighting parameter k are discussed below with respect to Table 1. At block 206, the method 200 calculates a node cost for each node n1, n2, . . . , and n30 in the network. In an embodiment, the node cost may be set to a quotient produced by dividing the number of links connected to a particular node (e.g., n1, n2, . . . , or n30) into the harmonic mean of the kth power of the costs of the links connected to the node. For example, the node cost may be derived mathematically via the formula below:

$$\text{Node Cost} = \frac{HarmonicMean(C1^k, C2^k, C3^k, \ldots)}{NumberOfLinks}. \quad \text{(Equation 1)}$$

The formula above may be rewritten using either of the formulas below, but each formula is otherwise the same as that above. Thus, unless stated otherwise, these three formulas are collectively referred to as Equation 1.

$$\text{Node Cost} = \frac{1}{\frac{1}{C1^k} + \frac{1}{C2^k} + \frac{1}{C3^k} + \ldots}, \text{ or}$$

$$\text{Node Cost} = \frac{1}{C1^{-k} + C2^{-k} + C3^{-k} + \ldots}$$

Note that that Equation 1 assumes that the link costs Cm are greater than zero. If the type of link costs being used permits a value of zero or a negative value, a constant may be added to assure positive costs. As an example using non-negative integer costs, assume a link cost is equal to zero, in which case link costs may be incremented by 1 before using Equation 1 to compute the Node Cost.

At block 208, the method 200 selects a root node based on the node costs calculated in block 206. In an embodiment, the node having the lowest node cost is selected as the root node.

Table 1 below includes a mapping between values of k and the effects of selecting different values of k.

TABLE 1

| Value of k | Effect |
| --- | --- |
| k = 0 | The node cost is set to the order of the node, i.e., the number of links connected to the node. |
| 0 < k < 1 | Cost is based on the number of links and on the low cost of links connected to the node but, as k decreases, the number of links is given greater weight and the cost of links less weight. |
| k = 1 | The number of links connected to the node and the low cost of links are given equal weight. In the specific case where cost is based on a reciprocal of the link bandwidth, the node cost calculated with k = 1 will order nodes by a reciprocal of the total bandwidth of the links connected to a node. |
| 1 < k | Cost is based on the number of links and on the low cost of links connected to the node but, as k increases, the number of links is given less weight and the cost of links greater weight. |

As can be seen from Table 1, setting k equal to zero has the effect of setting the node cost for a particular node equal to the reciprocal of the number of links connected to that node, while setting k equal to 1 has the effect of giving equal weight to the number of nodes connected to that particular node and the presence of low cost links. Generally speaking, this latter option may be a reasonable choice when little to no information is known about a to-be-constructed subgraph. Otherwise, setting k to a value greater or lesser than 1 may be more reasonable depending on the intended use.

For example, when constructing a general multicast traffic distribution tree or a spanning tree that carries a volume of unicast and multicast traffic, traffic to/from the various branch ends of the tree will tend to be concentrated in the middle of the tree. Thus, k may be set to a value greater than 1 in this case, as the cost of central links in the tree will affect most user traffic, so more weight should be given to the presence of low cost links. On the other hand, in applications with limited control traffic being flooded to nodes, having richer connectivity may be of higher priority (e.g., to get control information to more nodes faster). As such, k may be set to a value less than 1 such that more weight is given to selecting a root node having more links attached to the root node.

Figure 3:
FIG. 3 is a chart depicting Node Costs calculated according to embodiments of the disclosure.

FIG. 3 depicts a chart 300 of Node Costs calculated for the nodes n1, n2 . . . , n30 in the network 100 of FIG. 1A. The node costs were calculated based on an example where the high bandwidth links (i.e., n2-n1, n1-n3, n1-n4, and n4-n6) support speeds up to 100 megabits per seconds (mbps), while the other low bandwidth links support speeds up to 40 mbps. As shown in the chart 300, the link cost of a high bandwidth link ($Link_{HBW}$) is set to 200,000, while the link cost for a low bandwidth link ($Link_{LBW}$) is set to 500,000. It should be understood that the high bandwidth link and/or the low bandwidth link have other costs in other implementations. To demonstrate the effect of selecting weight parameter k at block 204 of the method 200, the node costs were calculated using different values of k as inputs to the formula disclosed above. It should be understood that other values of k may be used as input in other implementations.

The first column of the chart 300 specifies the node number corresponding to the nodes n1, n2 . . . , n30, where Node Number 1 corresponds to n1, Node Number 2 corresponds to n2, and so forth. The second and third columns specify the number of high bandwidth and low bandwidth links attached to each node. For example, the chart 300 specifies that node n1 is attached to three high bandwidth links (n1-n2, n1-n3, and n1-n4) and three low bandwidth links (n1-n25, n1-n24, and n1-n5), as depicted in FIG. 1A. The fourth, fifth, sixth, and seventh columns specify the Node Costs calculated using different values of k as inputs to Equation 1.

As previously mentioned, the method 200 may select a node having the lowest Node Cost as a root node. Thus, when k is set equal to 0.0, node n9 may be selected as the root node because the corresponding Node Cost is 0.10, which is the lowest Node Cost calculated using Equation 1. Note that node n9 has more links (10) attached to it than any other node. Thus, the Node Cost for node n9 is consistent with Table 1 for k=0, which indicates that the Node Cost is set to the number of links connected to that node. The node having the second most links connected to it is node n3, which has a total of 9 links connected to it. Therefore, node n3 has the second lowest Node Cost (0.11) when k is set to 0.0 as an input to Equation 1 for node n3. By comparison, nodes having only 1 connecting link (e.g., n10 and n14) have a Node Cost equal to 1.0, which is tenfold higher than the lowest Node Cost of node n9.

When k is set to 1.0 as an input to Equation 1, there are two nodes (n1 and n3) that may be selected as a root node because these nodes have the lowest Node Cost (47,619.05). In this case, a tiebreaking procedure may be implemented to select between nodes n1 and n3 as the root node. For example, node n1 may be selected as the root node because n1 is a lower numbered node than n3. Alternatively, node n3 may be selected as the root node because n3 is a higher numbered node than n1. As another example, node n3 may be selected as the root node because n3 is connected to more links than n1. As yet another example, node n1 may be selected as the root node if the number of high bandwidth links is an important criterion.

Figure 4A:
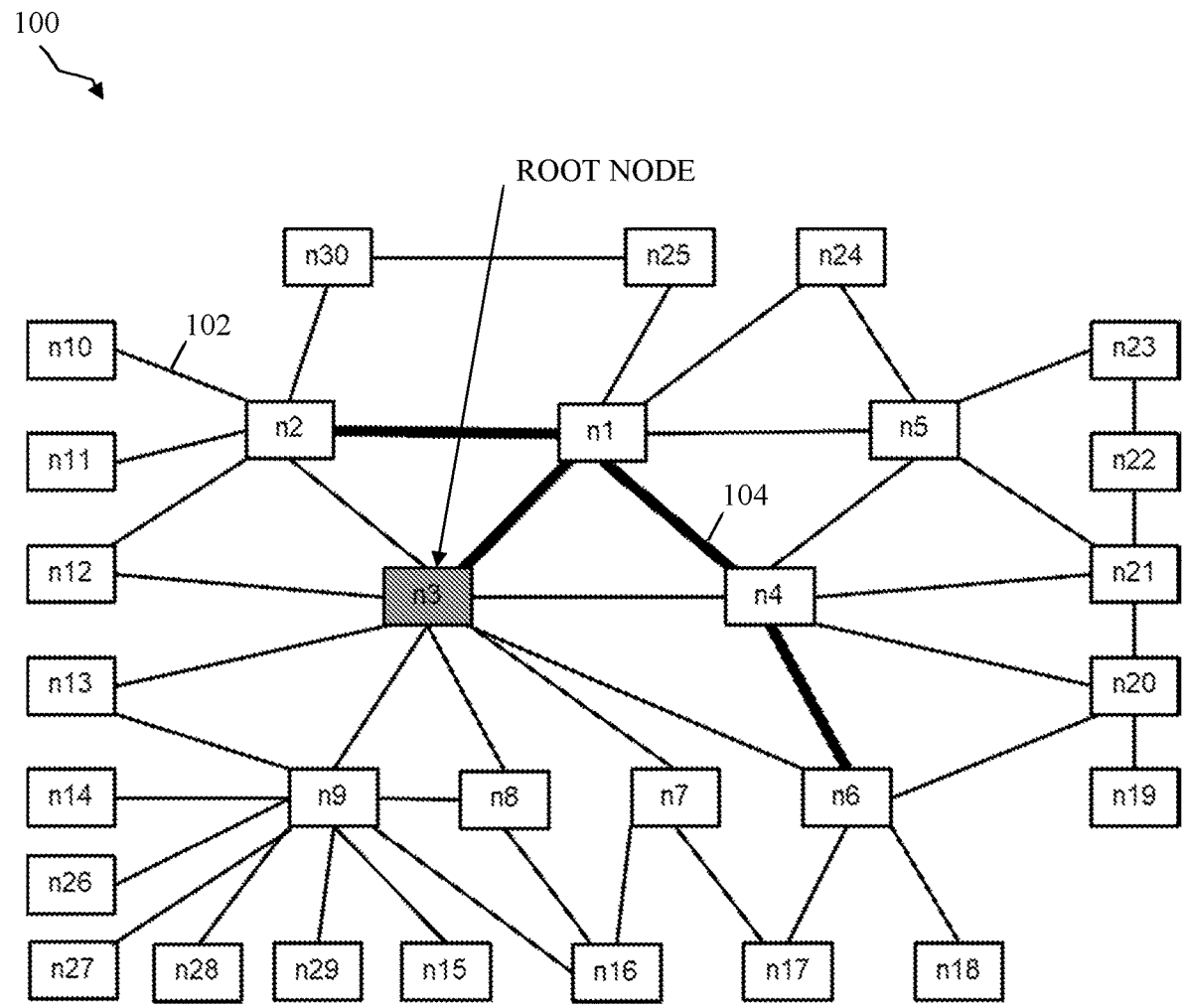
FIGS. 4A-4D and 5A-5D depict different stages of constructing subgraphs according to embodiments of the disclosure.

Referring now FIGS. 4A-4D, a process of constructing a subgraph of a network 100 will now be described using similar principles discussed with respect to FIGS. 1B-1H, except a root node is selected using the method 200 disclosed herein. Additionally, this process will be described using an example in which k is set to 0.8 as an input to Equation 1. As shown in the chart 300, node n3 has the lowest Node Cost (3,594.64) when using k=0.8 as an input to Equation 1. Thus, the method 200 may select node n3 as the root node in this case, as shown in FIG. 4A. This completes stage zero of the process.

Figure 4B:
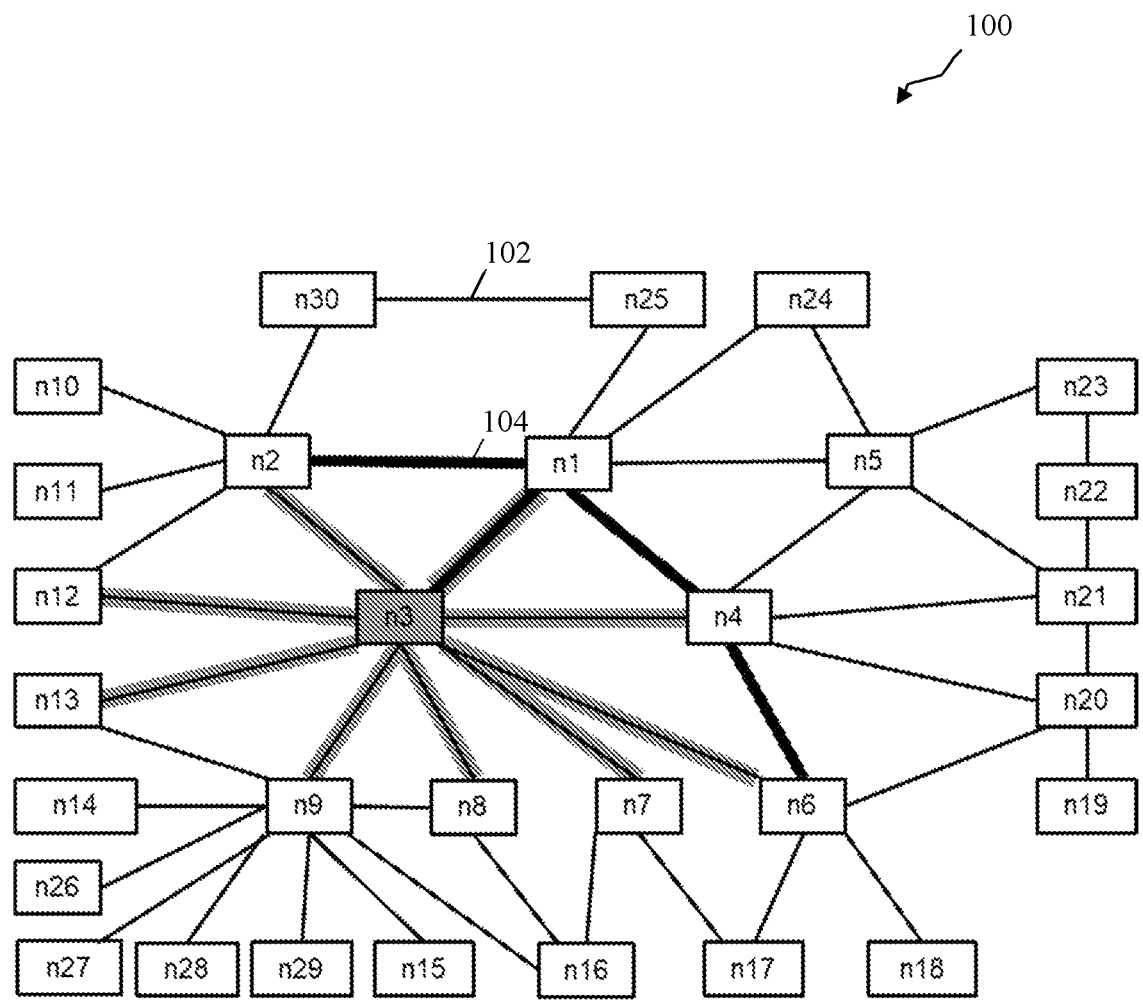

The first stage of constructing the subgraph involves connecting the root node n3 to one or more other nodes in the network 100 that are not yet part of the subgraph. In this example, the root node n3 has 9 available connections. Thus, the root node n3 may be connected to 9 layer one nodes to establish 8 low bandwidth links (n3-n2, n3-12, n3-n13, n3-n9, n3-n8, n3-n7, n3-n6, and n3-n4) and 1 high bandwidth link (n3-n1), as shown in FIG. 4B.

Figure 4C:
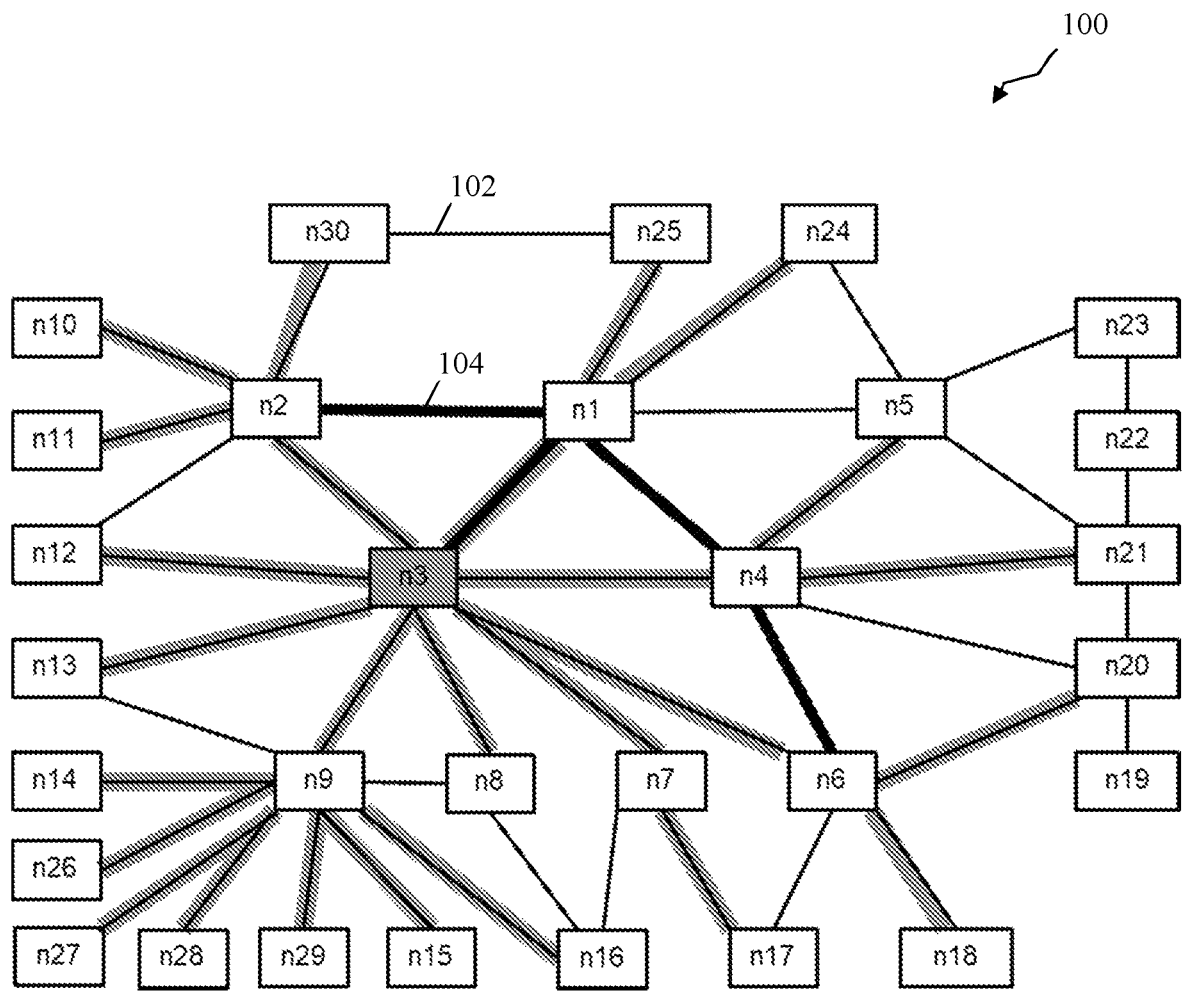

The second stage involves connecting layer one nodes n2, 12, n13, n9, n8, n7, n6, n4, and n1 to one or more nodes, beginning with node n13 because it is the highest numbered layer one node. Although node n13 has one available connection to node n9, a link is not added from n13 to n9 because n8 has already been connected to node n3. The second highest numbered layer one node is n12, but a link is not added for similar reasons. The third highest numbered layer one node is n9, which connects to layer two nodes n14, n26, n27, n28, n29, n15, and n16, but not nodes n8 or n13. The process continues in a similar manner as previously described until the second stage is complete, the results of which are shown in FIG. 4C.

Figure 4D:
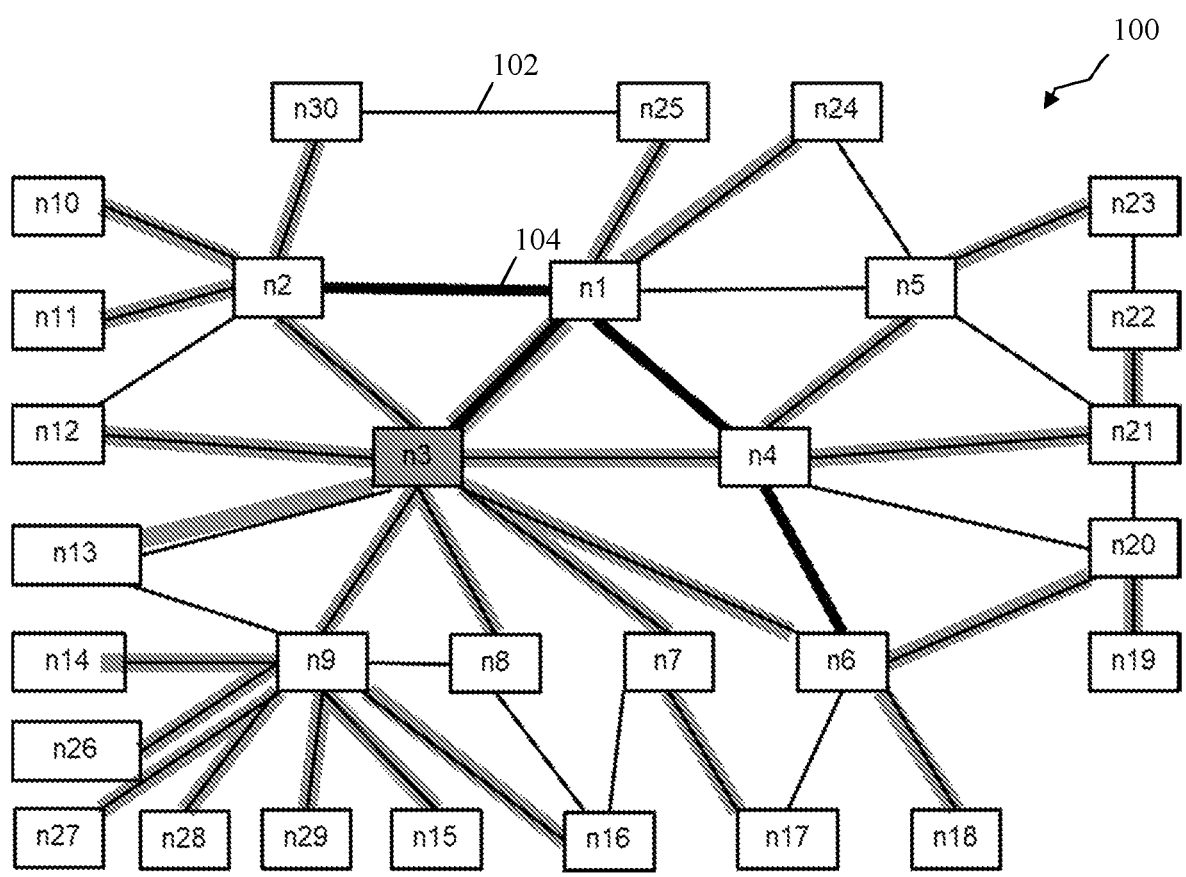

FIG. 4D depicts the results of the third and final stage of the process, where it can be seen that the constructed subgraph utilizes a high bandwidth link (n3-n1) and has a shorter maximum path length between nodes than the previously described subgraph constructed according to other approaches. For example, there are no more than 6 hops between edge nodes in FIG. 4D as compared to 10 hops between edge nodes in FIG. 1H. Additionally, the subgraph in FIG. 4D was constructed in only three stages, meaning only 3 steps are necessary to reach every node in the network 100.

Figure 5A:
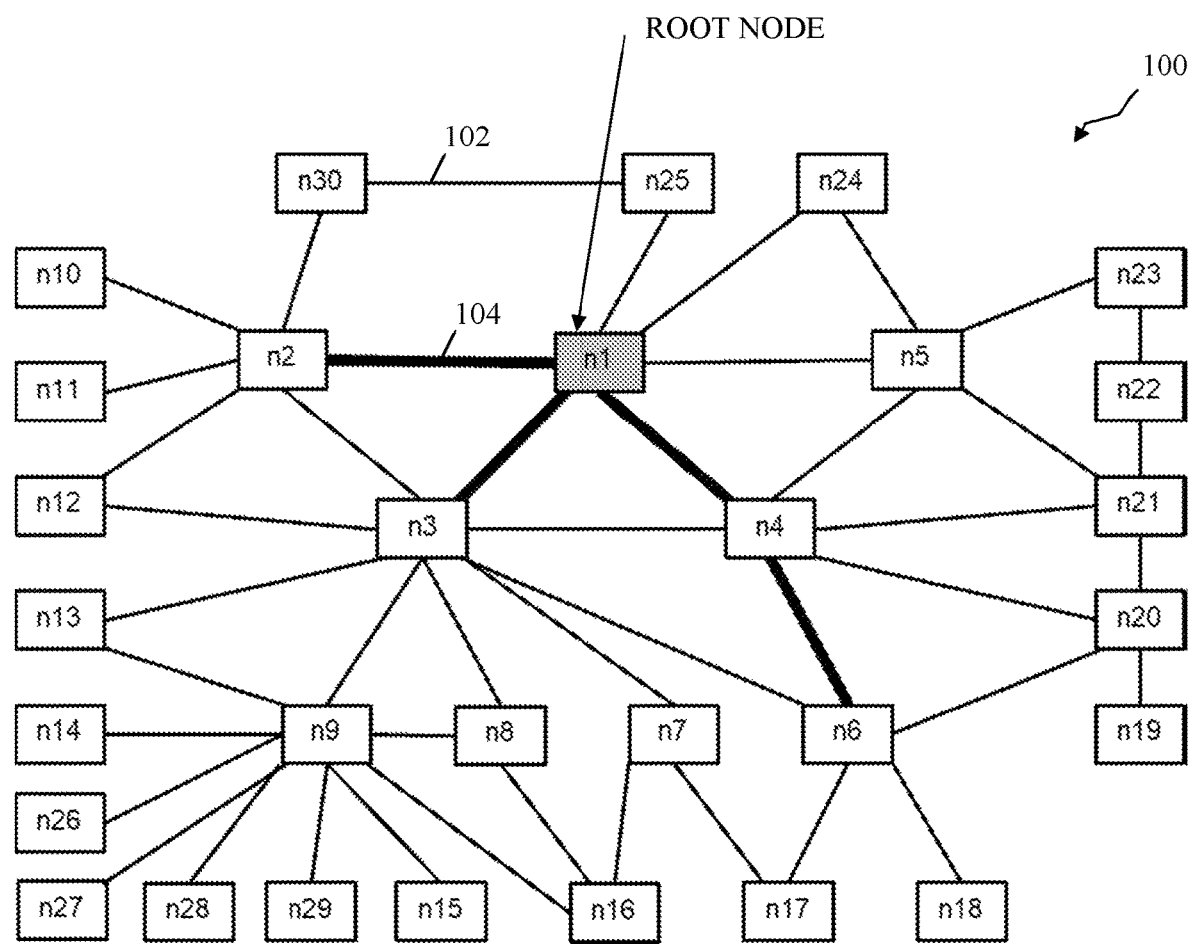

Referring now FIGS. 5A-D, a process of constructing a subgraph of a network 100 will now be described using similar principles discussed with respect to FIGS. 1B-1H, except a root node is selected using the method 200 disclosed herein. Additionally, this process will be described using an example in which k is set to 1.25 as an input to Equation 1. As shown in the chart 300, node n1 has the lowest Node Cost (1,069,584.62) when using k=1.25 as an input to Equation 1. Thus, the method 200 may select node n1 as the root node in this case, as shown in FIG. 5A. This completes stage zero of the process.

Figure 5B:
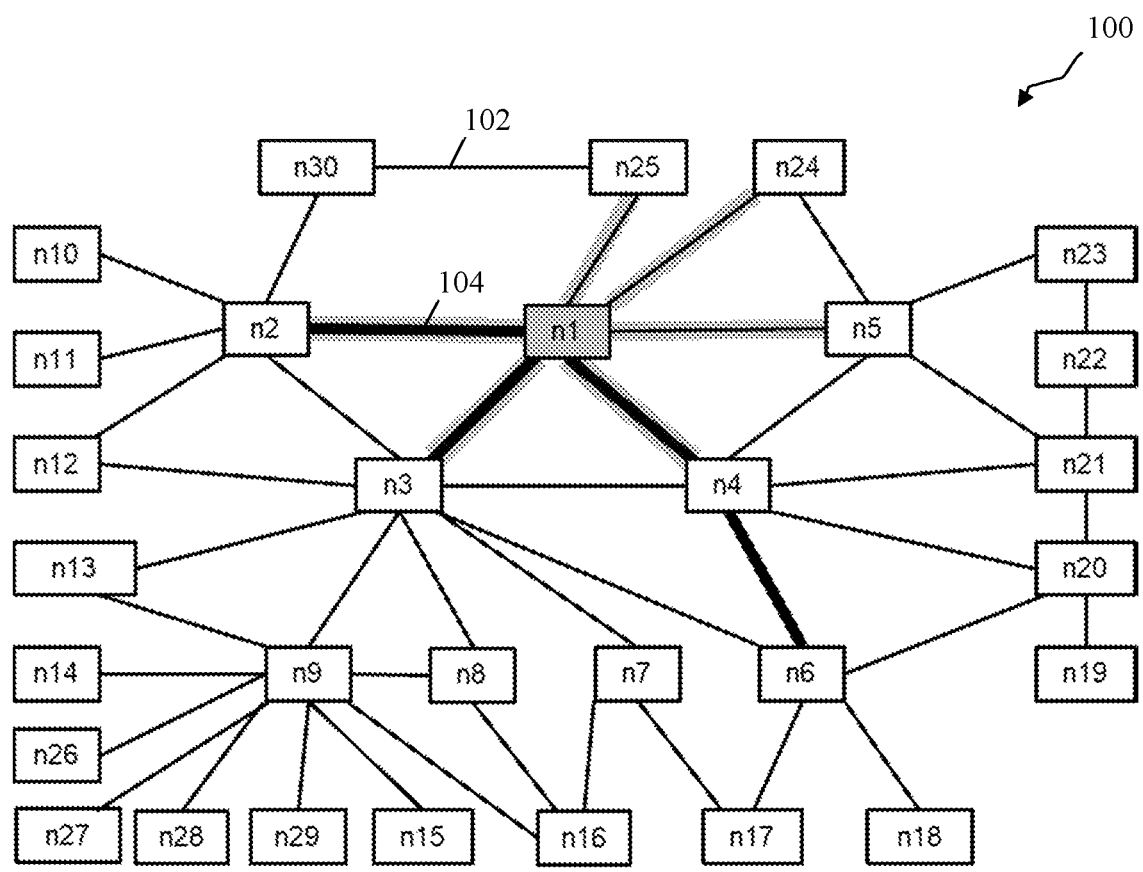

The first stage of constructing the subgraph involves connecting the root node n3 to one or more other nodes in the network 100 that are not yet part of the subgraph. In this example, the root node n1 has 6 available connections. Thus, the root node n1 may be connected to 6 layer one nodes to establish 3 low bandwidth links (n1-n25, n1-n24, and n1-n5) and 3 high bandwidth links (n1-n2, n1-3, and n1-n4), as shown in FIG. 5B.

Figure 5C:
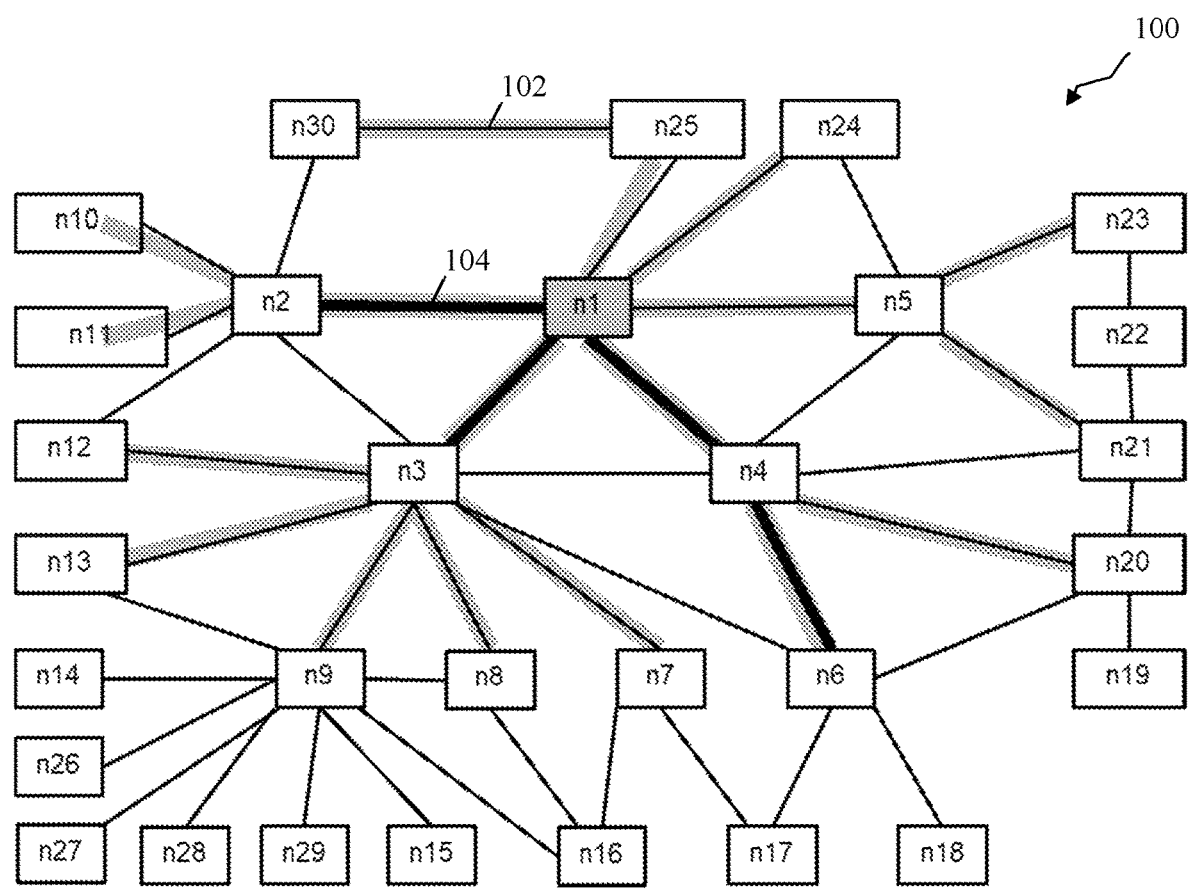

The second stage involves connecting layer one nodes n25, 24, n5, n2, n3, and n4 to one or more nodes, beginning with node n25 because it is the highest numbered layer one node and ending with layer one node n2 because it is the lowest numbered layer one node. FIG. 5C depicts the results of the second stage.

Figure 5D:
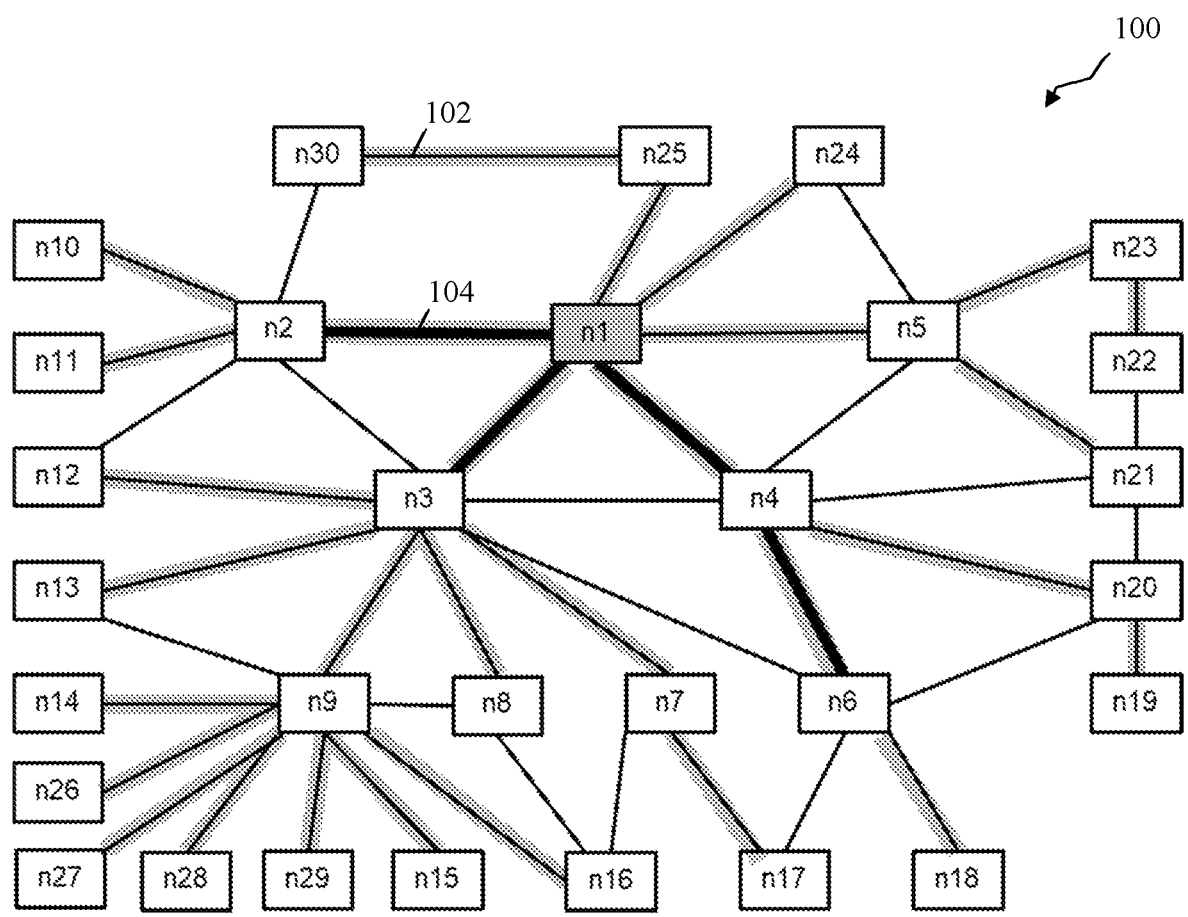

The third stage involves connecting layer two nodes to one or more nodes, beginning with node n30 because it is the highest numbered layer two node and ending with node n6 because it is the lowest numbered layer two node. FIG. 5D depicts the results of this third and final stage of the process, where it can be seen that the constructed subgraph utilizes 4 high bandwidth links (n1-n2, n1-n3, n1-4, and n4-n6) and has a shorter maximum path length between nodes than the previously described subgraph constructed according to other approaches. Accordingly, setting k to a value greater than 1 (e.g., k=1.25) may be appropriate for transmissions involving broadcast and multicast traffic. Like the subgraph in FIG. 4D, there are no more than 6 hops between edge nodes in FIG. 5D, and the subgraph was constructed in only three stages.

In some embodiments, costs of links in a network may be based on bandwidth, where the bandwidth of links from each node may be denoted as B1, B2, B3, and so forth. In such embodiments, selecting a node as the root node may involve selecting the node having the highest total bandwidth. The bandwidth for each node may be calculated as follows: Node Bandwidth=B1+B2+B3+ . . . .

In implementations where bandwidth may not be directly known or acquired, but the links are known to have costs C1, C2, C3, ..., the bandwidth may be estimated based on link costs as follows: Node Bandwidth=1/C1+1/C2+1/C3+ ....

In such embodiments and implementations, a node having the highest node bandwidth in the network may be selected as the root node. If there are two or more nodes in the network with the same highest node bandwidth, the node with the highest node bandwidth and the most amount of connecting links may be selected as the root node. If there is still a tie, the node with the highest node bandwidth, the most amount of connecting links, and the highest (or lowest) node identifier (ID) or address may be selected as the root node.

In some implementations, costs between links can be asymmetric, where the cost from node one N1 to node two N2 is different from the cost from node two N2 to node N1. In such implementations, the link cost used in the root selection method disclosed herein may be derived from the two different directional costs by computing the arithmetic, geometric, or harmonic mean of those cost or by selecting one in a systematic manner, such as selecting the highest or lowest of the two costs, or by any combination of these methods.

In some embodiments, the disclosed techniques may be employed to construct multiple distribution trees and/or flooding graphs for a particular network. That is, the disclosure is not limited to selecting a root node for a single tree/graph, as a network may comprise multiple trees/graphs at the same time, e.g., multiple trees/graphs may be in simultaneous use in a network. Therefore, multiple root nodes may be derived (e.g., using different values of k) to construct multiple trees/graphs, such that each tree/graph is tailored for certain applications (e.g., different types of traffic). For example, when a network is used for high bandwidth data transmissions, a root node may be derived to construct a tree/graph having low-cost links. As another example, when the network is used for transmitting control data with limited amounts of traffic, a root node may be derived to construct another tree/graph having many links (i.e., with less emphasis on link costs) to quickly distribute such control data.

Figure 6:
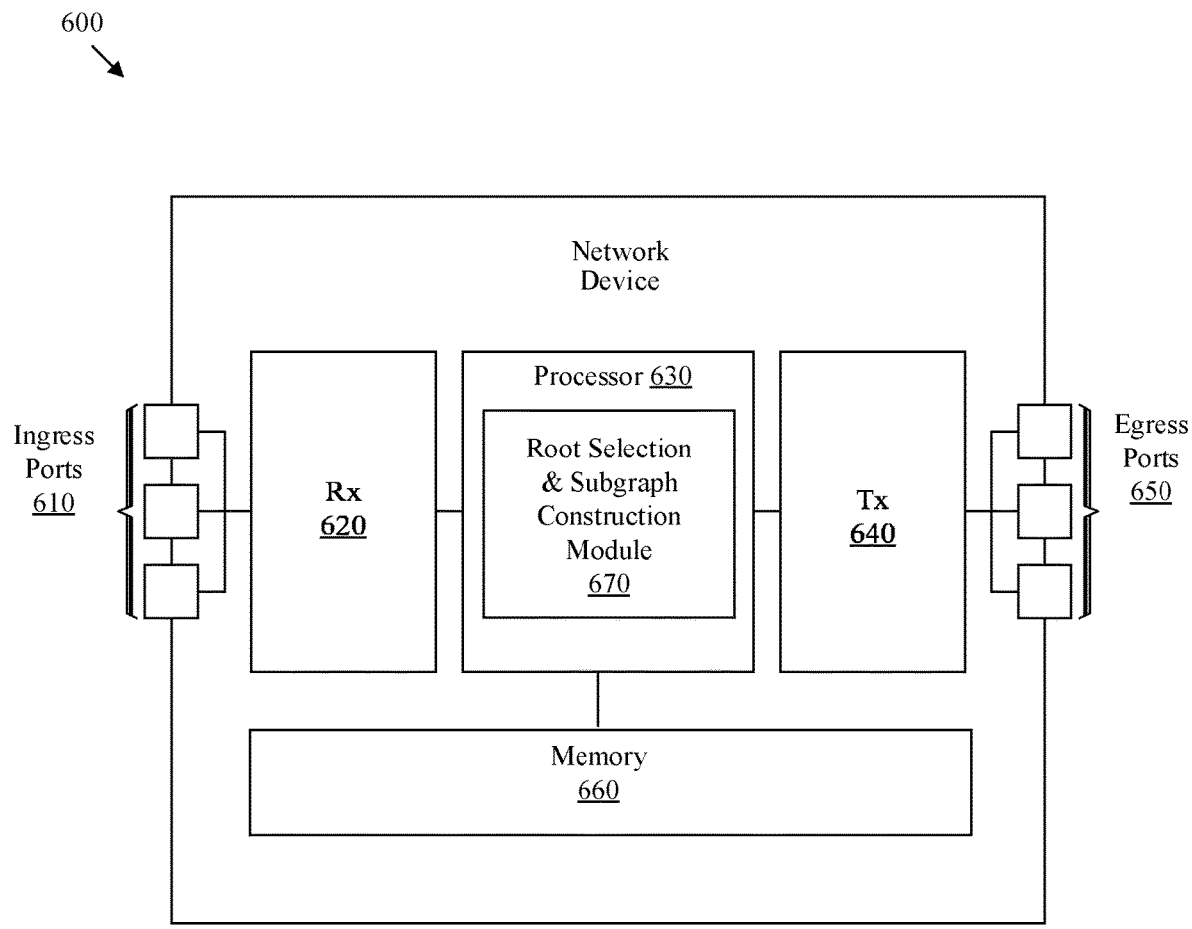
FIG. 6 is a schematic diagram of a network device according to an embodiment of the disclosure.

FIG. 6 is a schematic diagram of a network device 600 according to an embodiment of the disclosure. The network device 600 is suitable for implementing the components described herein. The network device 600 comprises ingress ports 610 and receiver units (Rx) 620 for receiving data; a processor, logic unit, or central processing unit (CPU) 630 to process the data; transmitter units (Tx) 640 and egress ports 650 for transmitting the data; and a memory 660 for storing the data. The network device 600 may also comprise optical-to-electrical (OE) components and electrical-to-optical (EO) components coupled to the ingress ports 610, the receiver units 620, the transmitter units 640, and the egress ports 650 for egress or ingress of optical or electrical signals.

In some embodiments, the network device 600 may connect to one or more bidirectional links. Moreover, at least one of the receiver units 620 may be integrated with at least one of the transmitter units 640. Additionally or alternatively, at least one of the receiver units 620 may be replaced with at least one transceiver unit. Similarly, at least one of the transmitter units 640 may be replaced with at least one transceiver unit. Further, at least one of the ingress ports 610 may be integrated with at least one of the egress ports 650. Additionally or alternatively, at least one of the ingress ports 620 may be replaced with at least one bi-direction port. Similarly, at least one of the egress ports 640 may be replaced with at least one bi-directional port. Accordingly, in such embodiments, the network device 600 may be configured to transmit and receive data over one or more bidirectional links via bi-directional ports 620 and/or 640.

The processor 630 may be implemented by hardware and software. The processor 630 may be implemented as one or more CPU chips, cores (e.g., as a multi-core processor), field-programmable gate arrays (FPGAs), application specific integrated circuits (ASICs), and digital signal processors (DSPs). The processor 630 may be in communication with the ingress ports 610, receiver units 620, transmitter units 640, egress ports 650, and memory 660. The processor 630 comprises a root node selection and subgraph construction module 670. The module 670 may implement the disclosed embodiments described above. For instance, the module 670 may implement the method 200 of FIG. 2 and processes discloses herein. The inclusion of the module 670 therefore provides a substantial improvement to the functionality of the device 600 and effects a transformation of the device 600 to a different state. Alternatively, the module 670 may be implemented as instructions stored in the memory 660 and executed by the processor 630.

The memory 660 comprises one or more disks, tape drives, and solid-state drives and may be used as an overflow data storage device, to store programs when such programs are selected for execution, and to store instructions and data that are read during program execution. The memory 660 may be volatile and non-volatile and may be read-only memory (ROM), random-access memory (RAM), ternary content-addressable memory (TCAM), and static random-access memory (SRAM).

Figure 7:
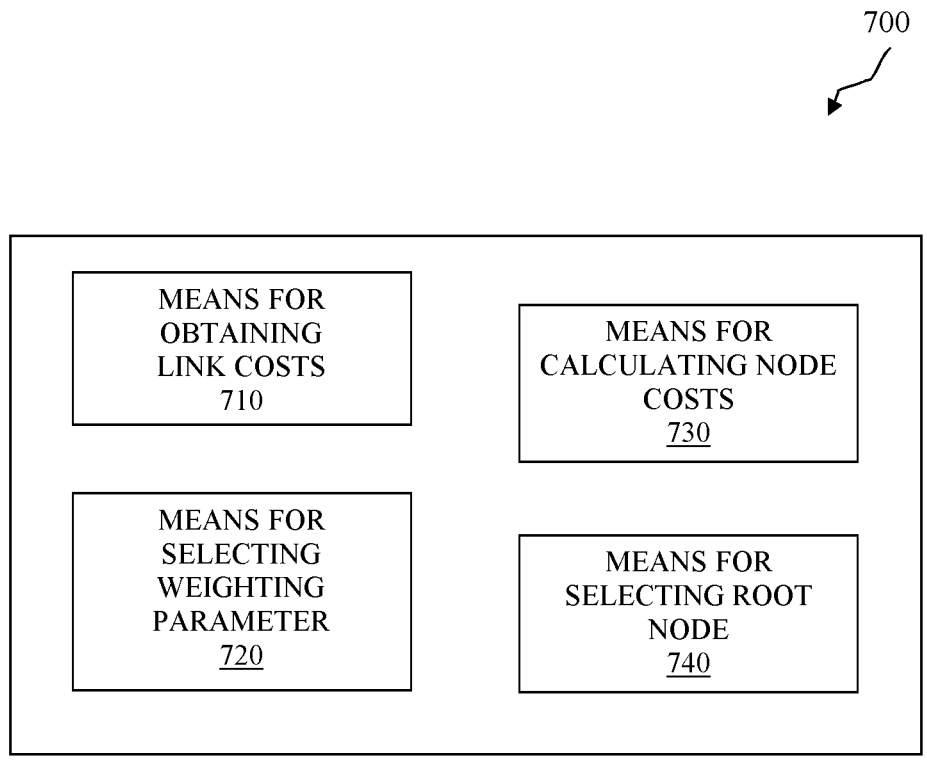
FIG. 7 is a schematic diagram of an apparatus for implementing root node selection and subgraph construction methods according to embodiments of the disclosure.

FIG. 7 is a schematic diagram of an apparatus 700 for performing root node selection in a network according to various embodiments of the disclosure. The apparatus 700 comprises means 710 for obtaining link costs of links connecting a plurality of nodes in the network; means 720 for selecting a weighting parameter based at least partly on the link costs; means 730 for calculating node costs corresponding to each of the plurality of the nodes based on the link costs and the weighting parameter; and means 740 for selecting a node as the root node based on the node costs, wherein the root node is selected from the plurality of nodes.

In some embodiments, the network device 600 and/or the apparatus 700 may comprise a controller (e.g., a Software Defined Network (SDN) controller) in a network (e.g., network 100). In other embodiments, the network device 600 and/or the apparatus 700 may comprise other types of network components such as a node, router, or the like.

The disclosed embodiments may be a system, an apparatus, a method, and/or a computer program product at any possible technical detail level of integration. The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of selecting a root node for a to-be-constructed subgraph of a network, the method comprising:
   obtaining link costs of links connecting a plurality of nodes in the network;
   selecting a weighting parameter based on the link costs;
   calculating node costs for each of the plurality of nodes based on a harmonic mean of a function of the link costs and the weighting parameter; and
   selecting a node from the plurality of nodes as the root node based on the node costs, wherein a node cost for calculating the node costs for each of the plurality of nodes is calculated using a formula comprising:

$$\text{Node Cost} = \frac{HarmonicMean(C1^k, C2^k, C3^k, \dots)}{NumberOfLinks},$$

where C1, C2, C3, . . . represent the links costs, where k represents the weighting parameter, and where Number of Links is a quantity of links connected to the node for which the node cost is calculated.

2. The method of claim 1, wherein selecting the node as the root node comprises selecting at least one node having a lowest node cost.

3. The method of claim 1, wherein selecting the weighting parameter is based on a first quantity of links connected to each node and a second quantity of links that are of lower link costs than other links in the network.

4. The method of claim 1, wherein C1, C2, C3, . . . are integers greater than zero.

5. The method of claim 4, wherein selecting the weighting parameter comprises setting k to a value greater than 1.

6. The method of claim 4, wherein selecting the weighting parameter comprises setting k to a value between 0 and 1.

7. The method of claim 4, wherein selecting the weighting parameter comprises setting k to a value equal to 1.

8. A network device for root node selection, comprising:
   a storage device;
   one or more processors coupled to the storage device and configured to execute instructions on the storage device such that when executed, cause the network device to:
   obtain link costs of links connecting a plurality of nodes in a network;
   select a weighting parameter based on the link costs;
   calculate node costs for each of the plurality of nodes based on a harmonic mean of a function of the link costs and the weighting parameter; and
   selecting a node from the plurality of nodes as a root node based on the node costs, wherein a node cost for calculating the node costs for each of the plurality of nodes is calculated using a formula comprising:

$$\text{Node Cost} = \frac{HarmonicMean(C1^k, C2^k, C3^k, \dots)}{NumberOfLinks},$$

where C1, C2, C3, . . . represent the links costs, where k represents the weighting parameter, and where Number of Links is a quantity of links connected to the node for which the node cost is calculated.

9. The network device of claim 8, wherein the network device selects the node as the root node by selecting at least one node having a lowest node cost.

10. The network device of claim 8, wherein the network device selects the weighting parameter based on a first quantity of links connected to each node and a second quantity of links that are of lower link costs than other links in the network.

11. The network device of claim 8, wherein C1, C2, C3, . . . are integers greater than zero.

12. The network device of claim 11, wherein the network device selects the weighting parameter by setting k to a value greater than 1.

13. The network device of claim 11, wherein the network device selects the weighting parameter by setting k to a value between 0 and 1.

14. The network device of claim 11, wherein the network device selects the weighting parameter by setting k to a value equal to 1.

15. A non-transitory computer readable medium configured to store instructions that, when executed by one or more processors of a network device, cause the network device to perform a method for selecting a root node, the method comprising:
   obtaining link costs of links connecting a plurality of nodes in a network;
   selecting a weighting parameter based on the link costs;
   calculating node costs for each of the plurality of nodes based on a harmonic mean of a function of the link costs and the weighting parameter; and
   selecting a node from the plurality of nodes as the root node based on the node costs, wherein a node cost for calculating the node costs for each of the plurality of nodes is calculated using a formula comprising:

$$\text{Node Cost} = \frac{HarmonicMean(C1^k, C2^k, C3^k, \dots)}{NumberOfLinks},$$

where C1, C2, C3, . . . represent the links costs, where k represents the weighting parameter, and where Number of Links is a quantity of links connected to the node for which the node cost is calculated.

16. The non-transitory computer readable medium of claim 15, wherein selecting the node as the root node comprises selecting at least one node having a lowest node cost.

17. The non-transitory computer readable medium of claim 15, wherein selecting the weighting parameter is based on a first quantity of links connected to each node and a second quantity of links that are of lower link costs than other links in the network.

* * * * *

UNITED STATES PATENT AND TRADEMARK OFFICE
CERTIFICATE OF CORRECTION

| | | |
|---|---|---|
| PATENT NO. | : 12,068,951 B2 | Page 1 of 1 |
| APPLICATION NO. | : 18/154706 | |
| DATED | : August 20, 2024 | |
| INVENTOR(S) | : Donald Eggleston Eastlake, III | |

It is certified that error appears in the above-identified patent and that said Letters Patent is hereby corrected as shown below:

On the Title Page

Item (71) Applicant: Delete "Huawei Technologies Co., Ltd., Guangdong (CN)" and insert
-- Huawei Technologies Co., Ltd., Shenzhen (CN) --.

Signed and Sealed this
Twenty-fourth Day of September, 2024

Katherine Kelly Vidal
*Director of the United States Patent and Trademark Office*